US007818663B2

(12) United States Patent
Khaba

(10) Patent No.: US 7,818,663 B2
(45) Date of Patent: Oct. 19, 2010

(54) EDITABLE INFORMATION MANAGEMENT SYSTEM AND METHOD

(75) Inventor: Avtar Khaba, Middlesex (GB)

(73) Assignee: Onedoc Limited, Surrey (GB)

( * ) Notice: Subject to any disclaimer, the term of this patent is extended or adjusted under 35 U.S.C. 154(b) by 1123 days.

(21) Appl. No.: 11/474,072

(22) Filed: Jun. 23, 2006

(65) Prior Publication Data

US 2007/0136662 A1 Jun. 14, 2007

Related U.S. Application Data

(63) Continuation-in-part of application No. PCT/GB2004/004444, filed on Oct. 20, 2004.

(30) Foreign Application Priority Data

Dec. 23, 2003 (GB) ................................. 0329824.7

(51) Int. Cl.
*G06F 17/00* (2006.01)
(52) U.S. Cl. ...................... 715/229; 715/255
(58) Field of Classification Search ................ 715/229, 715/255, 751
See application file for complete search history.

(56) References Cited

U.S. PATENT DOCUMENTS

| 5,008,853 | A | * | 4/1991 | Bly et al. ..................... 715/751 |
| 5,437,005 | A | * | 7/1995 | Torres ......................... 715/209 |
| 5,655,130 | A | | 8/1997 | Dodge et al. |
| 5,680,613 | A | * | 10/1997 | Atsumi ................... 707/103 R |
| 5,897,645 | A | * | 4/1999 | Watters ....................... 715/210 |
| 5,920,867 | A | * | 7/1999 | Van Huben et al. ......... 707/101 |
| 6,035,297 | A | * | 3/2000 | Van Huben et al. ............ 707/8 |
| 6,061,697 | A | * | 5/2000 | Nakao ......................... 715/229 |
| 6,154,753 | A | * | 11/2000 | McFarland .................. 715/221 |
| 6,393,437 | B1 | | 5/2002 | Zinda et al. |
| 6,470,363 | B1 | * | 10/2002 | Kanerva et al. ............. 715/208 |
| 7,606,840 | B2 | * | 10/2009 | Malik ......................... 707/203 |
| 2003/0074248 | A1 | * | 4/2003 | Braud et al. .................... 705/9 |
| 2003/0121008 | A1 | | 6/2003 | Tischer |
| 2007/0186157 | A1 | * | 8/2007 | Walker et al. ............... 715/530 |

FOREIGN PATENT DOCUMENTS

| EP | 0814425 | A2 | 12/1997 |
| EP | 1233351 | A2 | 8/2002 |

(Continued)

OTHER PUBLICATIONS

Wiederhold, Gio, "Digital Libraries, Value, and Productivity", Communications of the ACM, vol. 30, Issue 4, Apr. 1995, pp. 85-96.*

(Continued)

*Primary Examiner*—Laurie Ries
(74) *Attorney, Agent, or Firm*—Michael Best & Friedrich LLP

(57) ABSTRACT

An editable information management method for managing editable information. The method comprises storing a document as a plurality of segment objects, each segment object being editable independently of other segment objects. The method comprises combining said segment objects to create said document, displaying said document for editing, editing part of the displayed document corresponding to a predetermined segment object, and updating said predetermined segment object in response to said editing.

62 Claims, 30 Drawing Sheets

FOREIGN PATENT DOCUMENTS

| | | | |
|---|---|---|---|
| GB | 2390713 | B | 3/2005 |
| GB | 2395300 | A | 5/2005 |
| GB | 2409541 | A | 6/2005 |
| JP | 2000020578 | A | 1/2000 |
| WO | 0109763 | A1 | 2/2001 |
| WO | 0157721 | A2 | 8/2001 |

OTHER PUBLICATIONS

Decouchant, Dominique et al., "AllianceWeb: Cooperative Authoring on the WWW," pp. 286 through 295, 0-7695-0268-7/99, IEEE, France, 1999.

Surjanto, B. et al., "XML Content Management Based on Object-Relational Database Technology," pp. 70 through 79, University of Kaiserslautern, Department of Computer Science, 0-7695-0577-5/00, 2000, IEEE, Kaiserslautern, Germany.

Decouchant D et al: "Structured and Distributed Cooperative Editing in a Large Scale Network" Online Publication (IMAG-INRIA Report)-Mirrored Copy, Nov. 1995, XP002369888 Retrieved from the Internet: URL:http://xml.coverpages.org/bib-ce.html> [retrieved on Feb. 23, 2006].

Emmet L: "Experiences of using open hypertext to support safety documentation" Proceedings of the 5th Workshop on Open Hypermedia Systems, Feb. 21, 1999, pp. 23-28, XP002369889 Darmstadt, Germany Retrieved from the Internet: URL:http://www.aue.auc.dk/~kock/OHS-HT99/o hs5.pdf> [retrieved on Feb. 27, 2006].

\* cited by examiner

MandorlaObject — 37

| PK | ObjectID |
|---|---|
|  | ObjectName |
|  | ObjectOwnerID |
|  | ObjectNotes |
|  | ObjectVersionID |

FIG 5A

MandorlaObjectVersion — 38

| PK | ObjectVersionID |
|---|---|
| PK | ObjectID |
|  | VersionChangeNotes |
|  | DateTimeStamp |
|  | UserIDLockedTo |
|  | LastUpdate |
|  | ObjectOwnerID |
|  | CheckInNotes |
|  | CheckOutNotes |
|  | LockStatus |
|  | UserIDAssignedTo |
|  | SequenceCount |
|  | ObjectVersionNo |
|  | ObjectStatus |

FIG 5B

MandorlaObjectBlob — 39

| PK | ObjectID |
|---|---|
| PK | ObjectVersionID |
|  | ObjectImage |
|  | ObjectLocalFileName |
|  | LastUpdate |
|  | ObjectContainerFileName |

FIG 5C

MandorlaUser — 40

| PK | UserLoginID |
|---|---|
|  | UserID |
|  | UserName |
|  | UserPassword |
|  | email |
|  | UserPrivilegeLevel |

FIG 5D

MandorlaSharedObject — 41

| PK | SharedObjectID |
|---|---|
| PK | SharedObjectVersionID |
|  | SharedObjectDesc |
|  | SharedObjectName |
|  | LastUpdate |
|  | UserIDAssignedTo |
|  | CheckOutNotes |
|  | CheckInNotes |
|  | SharedObjectOwnerID |
|  | VersionName |
|  | VersionNotes |
|  | SharedObjectType |
|  | UserIDLockedTo |
|  | SharedObjectVersionNo |
|  | SharedObjectStatus |
|  | LockStatus |
|  | CopySharedObjectUserID |

FIG 5E

MandorlaSharedObjectBlob — 42

| PK | SharedObjectID |
|---|---|
| PK | SharedObjectVersionID |
|  | SharedObjectImage |
|  | SharedObjectLocalFileName |

FIG 5F

| MandorlaLinkedObjects | |
|---|---|
| PK | ObjectLinkID |
| | ObjectID<br>ObjectVersionID<br>SharedObjectID<br>SharedObjectVersionID<br>ObjectVersionNo<br>SharedObjectVersionNo<br>BookMark<br>StartPos<br>EndPos<br>LastUpdate<br>SequenceCount<br>HasCopySharedObject<br>CopySharedObjectOwnerID |

FIG 5G

| MandorlaCopySharedObject | |
|---|---|
| | CopyObjectID |
| | MasterSharedObjectID<br>MasterSharedObjectVersionID<br>CopySharedObjectID<br>CopySharedObjecVersonID<br>MasterSharedObjectOwnerID<br>CopySharedObjectOwnerID |

FIG 5H

| MandorlaGlobalTemplate | |
|---|---|
| PK | GlobalTemplateID |
| | GlobalTemplateName<br>GlobalTemplateImage<br>DateTimeStamp<br>GlobalTemplateType |

FIG 5I

| MandorlaWordTemplate | |
|---|---|
| PK | TemplateID |
| | TemplateName<br>TemplateImage<br>TemplateNotes |

FIG 5J

| MandorlaUserAccess | |
|---|---|
| PK | UserID |
| | UserAccessID |
| | ObjectID |
| | ObjectVersionID |
| | SharedID |
| | SharedObjectVersionID |

FIG 5K — 47

| MandorlaApplicationLog | |
|---|---|
| PK | LogID |
| | ObjectID |
| | ObjectVersionID |
| | SharedObjectID |
| | SharedObjectVersionID |
| | UserID |
| | LogText |
| | DateCreated |
| | VersionNo |

FIG 5L — 48

| MandorlaAudit | |
|---|---|
| PK | AuditID |
| | AuditUserID |
| | AuditMessage |
| I1 | DateCreated |

FIG 5M — 49

EDITABLE INFORMATION MANAGEMENT SYSTEM AND METHOD

RELATED APPLICATIONS

The present application is a continuation-in-part patent application of co-pending International Application No. PCT/GB2004/004444 filed on Oct. 20, 2004, which claims priority to British Patent Application No. 0329824.7 filed on Dec. 23, 2003, the entire contents of which are both herein incorporated by reference.

BACKGROUND OF THE INVENTION

The present invention relates to an editable information management system and method.

The use of personal computers has revolutionised the manner in which documents are created and managed. It is now relatively easy for an individual having a PC to create and print documents which look professional and are well presented. Typically, such documents are created in a word processor such as Microsoft™ Word™, and then printed using, for example, a laser printer. Using such a word processor a user can input text using a keyboard, and format inputted text by using different fonts, type sizes, and type styles. Images and other suitable data can also typically be inserted into documents created in this way.

Some documents require calculations to be performed on inputted data, and in such cases it may be easier to use a spreadsheet such as Microsoft™ Excel™ for input of data, and execution of the necessary calculations. Again, using such spreadsheets documents can be printed in a professional manner using for example a laser printer.

Currently available software provides stand alone users with powerful document creation applications such as those described above. However, such software is limited where there is a requirement for a plurality of users to collaborate in creating a single document. In such circumstances it is common for a first user to create and edit a document, and email the document to a second user who adds further data. Such a solution is clearly disadvantageous given that the first and second users can not concurrently work on the document.

If a document is to be worked on by a plurality of users connected to a computer network, known software products allow a first user to access the requested file, and inform any subsequent user attempting to access the file of the first user's access. The subsequent user is then typically given an option to open a read only copy of the file (given that the first user has a read/write copy of the file), or alternatively to wait until the first user has finished editing the document. Again, such functionality does not allow a plurality of users to access a single document concurrently.

U.S. Pat. No. 5,181,162 (Eastman Kodak Company) discloses an object oriented document management system in which a document (such as newspaper) is created as a plurality of logical objects which can be edited independently of one another, and a plurality of layout objects which can be edited independently of one another. When the document is to be produced, the logical objects and layout objects are combined to produce a finished document. Such a system is convenient for the creation of newspapers, as individual stories can be created by individual journalists as individual logical objects, which can then be combined to create the finished document. However, the system proposed by U.S. Pat. No. 5,181,162 does not allow a plurality of users to view a single complete document concurrently, and can not be used with commonly used software packages such as those described above.

SUMMARY OF THE INVENTION

It is an object of the present invention to obviate or mitigate one or more of the problems outlined above.

According to a first aspect of the present invention, there is provided a method and system for managing editable information. Such editable information may take many forms, including for example, text based documents editable by a word processor, such as Microsoft Word, spreadsheets editable using, for example, Microsoft Excel, presentations editable using software such as Microsoft PowerPoint, drawings editable using drawing packages such as Microsoft Visio, and any other editable information. The term "document" is used herein to refer to any such editable information in any form.

The invention provides a document management method comprising storing a document as a plurality of segment objects, each segment object being editable independently of other segment objects, combining said segment objects to create said document; displaying said document for editing; receiving edit instructions to edit part of the displayed document corresponding to a predetermined segment object; and updating said predetermined segment object in response to said editing.

The present invention therefore allows a plurality of users to view a document concurrently, with different users being allowed to edit different segment objects.

In some embodiments, a plurality of users access a single document, each user editing different segment objects. An update made by a first user to a first segment object may be communicated to a second user by means of an audio or visual alert at predetermined time intervals, thereby ensuring that both first and second users both have access to reasonably up to date information. In some embodiments of the invention only a single user can have a read/write copy of a segment object at a particular time. Other users can however access a read only copy of that segment object and be alerted of updates in the manner outlined above. However, in some embodiments of the invention a first user can be granted read/write access to a segment object while a second user is provided with a copy of that segment object, also with read/write access. Changes made to the copy of the segment object by the second user can later be merged with the changes made by the first user.

The method preferably comprises displaying markers identifying boundaries between segment objects within said displayed document. For example, where the document is a word document these markers may take the form of Microsoft Word comments including data pertinent to each segment object. At least one segment object within said displayed document may be locked to prevent editing. The or each locked segment object is preferably marked in said displayed document.

The document may be stored as a master object and a plurality of segment objects, and said combining may combine the master object and the plurality of segment objects in a manner specified by said master object to create said displayed document. The master object comprises document data, such as for example, text or image data. Said master object may comprises data indicating positional information relating to said plurality of segment objects, and said method may parse said master object to insert said segment objects into said master object to create said displayed document.

Said master object may comprise a plurality of pointers, each pointer indicating a sub document file.

Data relating to said master object and said plurality of segment objects may be stored in a database. The database may take any suitable form such as a relational database, an XML data store or file system storage. A plurality of different versions of the master object may be stored in, a master object versions database table. The database may additionally comprise an objects database table having a single record for said master object identifying a latest version of said master object. The method may comprise storing data relating to a plurality of different versions of each segment object in a segments database table. The database may comprise a links table storing relationships between said master object and said plurality of segment objects. Said links table may comprise a record for each segment object related to said master object.

The method may further comprise selecting at least one further segment object for inclusion in said displayed document, and including said further segment object in said displayed document. A record may be added to said links table representing said further segment object. The method allows multiple occurrences of a segment object to be included within the same master document. (This is useful if a particular image occurs a plurality of times within a document, and allows only a single copy of that image to be stored, with updates to the image being reflected in all inclusions of the image within the document.)

Said database may comprise a plurality of master objects, each relating to a respective document. At least one of said segment objects may be associated with a plurality of master objects.

Said displayed file is displayed using an application program such as a word processor (e.g. Microsoft™ Word) or a spreadsheet (e.g. Microsoft™ Excel™). Said application program may comprise an add-in configured to combine said segment objects. Said add-in may communicate with a broker application configured to retrieve document data from a database. Said application program and said broker application may be run on a workstation, said database may be run on a server remote from said workstation, and communication between said broker application and said database is carried out over a computer network. The computer network may be the Internet, or alternatively, the computer network may be a Local Area Network (LAN), or another Wide Area Network (WAN).

Said broker application and said application program may be run under an operating system comprising a registry and when data is to be transmitted from the broker application and the application program, the broker application may place data in the registry, and the application program may retrieve said data from the registry. Similarly, when data is to be transmitted from the application program to the broker application, the application program may place data in the registry, and the broker application may retrieve said data from the registry. Alternatively, the broker and add-in may communicate via, for example a shared file stored in a predetermined location.

The broker application may communicate with said add-in using the Transmission Control Protocol (TCP).

The application program may be run on a workstation, the broker application and the database may-be run on a server remote from said workstation, and communication between said add-in and said broker application may carried out over a computer network (e.g. a LAN or a WAN such as the Internet). Said broker application and said add-in may suitably communicate using the TCP protocol. A plurality of workstations may be configured to communicate with said database, thereby allowing a plurality of users to access common document data.

A further aspect of the invention provides a method for transmitting data from a first application process to a second application process, said first and second application processes running under an operating system comprising a registry, wherein:

the first application process places data in the registry; and the second application process retrieves said data from the registry.

Use of the registry in this way offers a number of benefits, for example the registry can store data which can be used for application recovery in case of a crash. Use of the registry also provides a convenient synchronisation mechanism, preventing possible dead-lock situations.

The method may comprise establishing within said registry a plurality of registry keys for communication of data. Said plurality of registry keys may include a user input registry key for storing details of user input to the first application. Said user input may comprise a selection from a menu.

Said registry keys may include a plurality of transaction registry keys, each configured to store data related to predetermined transaction, and the method may comprise storing data in a transaction registry key determined by user input to the first application. Said second application may interrogate said user input registry key to determine a transaction registry key in which said data can be found.

Said first application may be configured to edit at least one document. Said registry keys may include a document registry key configured to store details of one or more documents currently being edited by said first application. Said document registry key may stores details of a file name where a document is stored. Said second application may retrieve said filename from said document registry key to obtain said document.

In some aspects, the invention provides a document management method comprising processing an input file representing a document to create a plurality of segment objects, each segment object being editable independently of other segment objects, editing at least one segment object to create an edited segment object; and combining said segment objects to create an amended document including said edited segment object.

Said processing may create a master object, each segment object may be associated with the master object, and said combining may combine the master object and the plurality of segment objects in a manner specified by said master object to create said output file. Said master object may comprise data indicating positional information relating to said plurality of segment objects, and said method may parse said master object to insert said segment objects into said master object to create said displayed document. Said master object may comprise a plurality of pointers, each pointer indicating a where a segment object should be inserted. It will be appreciated that in some embodiments of the invention, content included in the master document may be overwritten by content taken from a segment object.

A plurality of input files may be processed, a master object may be created for each input file, and each segment object may be associated with at least one master object. At last one segment object may be associated with a plurality of master objects. The master objects and the segment objects may be stored in a database.

The method may comprise creating an output file representing said amended document. Said input file and said output file are preferably in a common file format, for example, both files may be Microsoft Word files or Microsoft Excel files, or alternatively files created using any other suitable application, such as for example Star Office. Segment objects may be represented using Microsoft Word Sub documents The invention also provides a method for controlling document creation in an application providing a macro language, comprising: analysing data indicative of user input to the application; creating a macro in response to said analysis and predefined criteria; and providing said macro to said application to affect document creation.

Said application may comprise an add-in configured to monitor user input to the application. Data indicative of user input may be transmitted to a remote server by the add-in, said remote server being configured to create said macro. The computer network may be a WAN such as the Internet, or alternatively a LAN. Data may be transmitted using the TCP protocol. Said macro may impose predetermined style constraints on a document to be created, and/or may lock part of said document to prevent user editing.

The methods defined above may be carried out using a suitably programmed computer. The invention further provides a data carrier carrying computer program code means to cause a computer to carry out a method as defined above.

BRIEF DESCRIPTION OF THE DRAWINGS

Embodiments of the present invention will now be described, by way of example, with reference to the accompanying drawings, in which:

FIGS. 5A to 5M are illustrations of tables stored within the document data database of FIG. 1;

DETAILED DESCRIPTION

Figure 1:
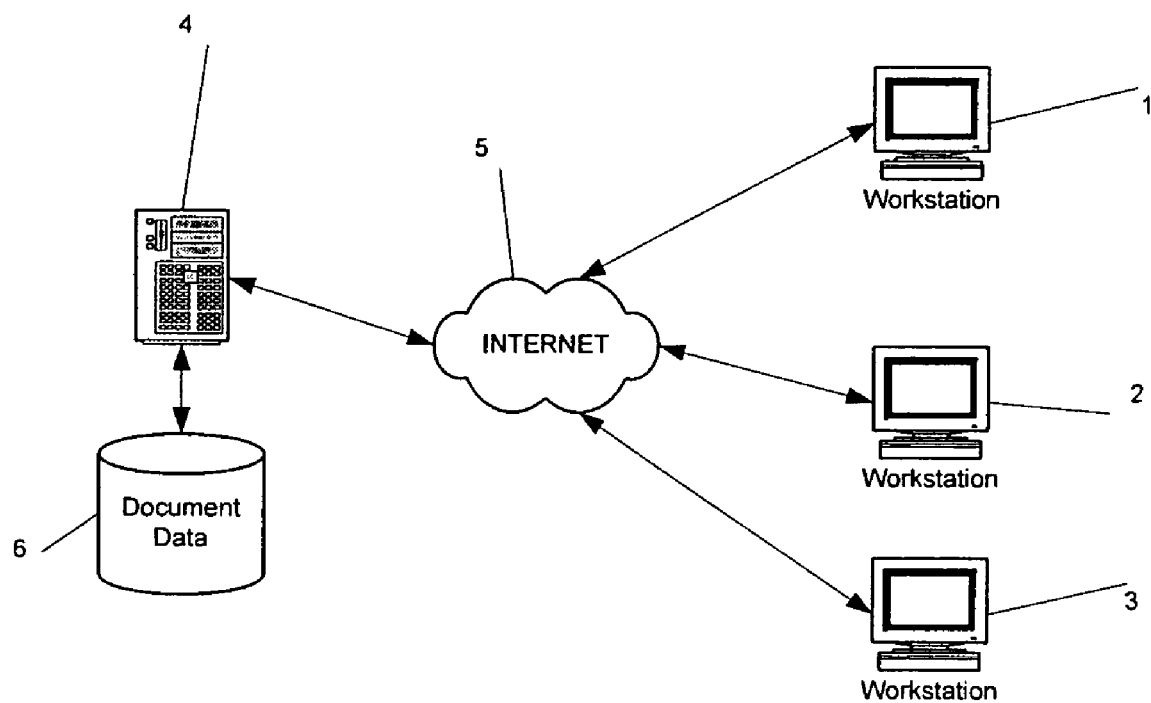
FIG. 1 is a schematic illustration of a network of computers configured to implement the present invention.

Referring to FIG. 1, there is illustrated a network of computers. Three workstations 1, 2, 3 are connected to a server 4 via the Internet 5. The server 4 is connected to a non-volatile storage device such as a hard disk drive which stores document data in a database 6. The workstations 1, 2, 3 are able to access the database 6 stored on the hard disk drive by appropriate communication with the server 4 via the Internet 5. Although the embodiment of FIG. 1 shows connection via the Internet, it will be appreciated that communication via other computer networks such as a local area network or an Intranet is also possible.

Figure 2:
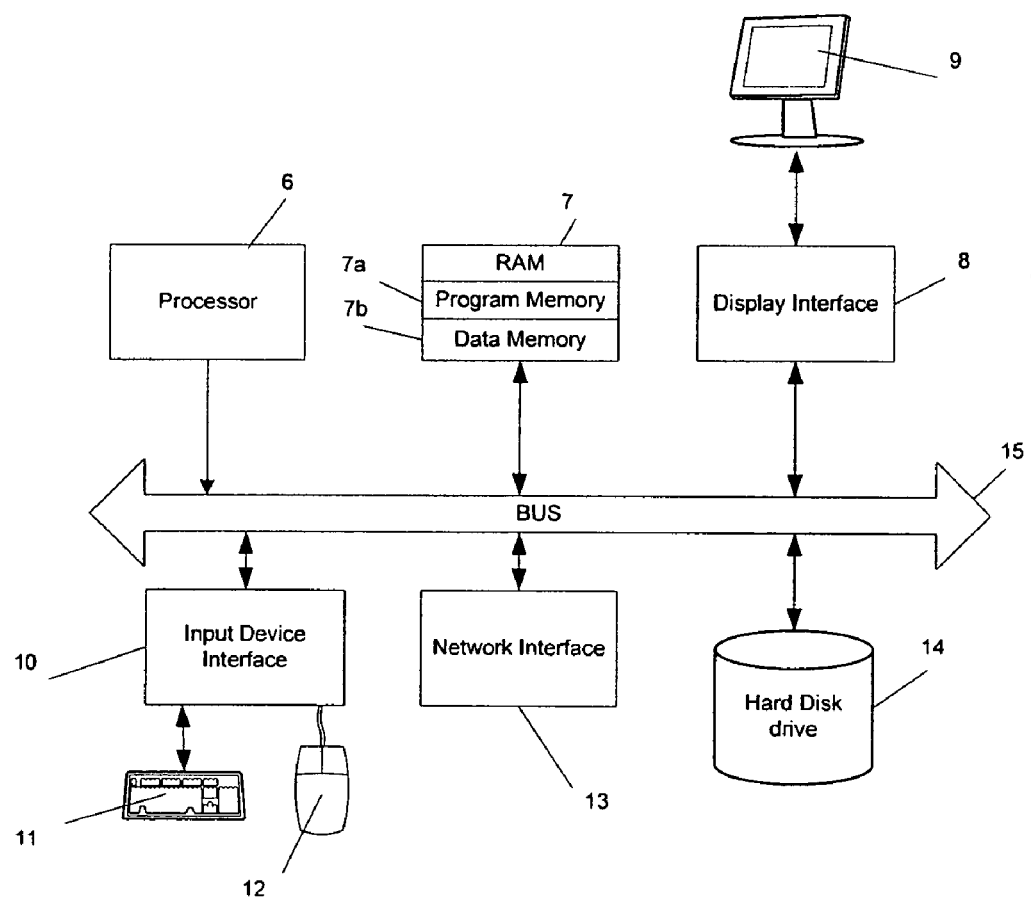
FIG. 2 is a schematic illustration of the architecture of one of the workstations of FIG. 1.

FIG. 2 schematically illustrates the architecture of the workstation 1 of FIG. 1 (the workstations 2, 3 have similar architectures). It can be seen that the workstation comprises a processor 6 and Random Access Memory (RAM) 7. The RAM 7 is in use divided to provide a program memory 7a and a data memory 7b, and the processor 6 is configured to execute instructions specified in programs stored in the program memory 7a. The workstation further comprises a display interface 8 which is connected to a monitor 9, an input device interface 10 which is connected to a keyboard 11 and a mouse 12, and a network interface 13 configured to allow the workstation 1 to access the Internet 4. The network interface can either be a device allowing connection to a LAN which is itself connected to the Internet, or alternatively a modem which allows a dial-up connection to be established. The workstation further comprises a non-volatile storage device in the form of a hard disk drive 14. Components of the workstation are connected together by a bus 15, along which both data and instructions are passed.

Figure 3:
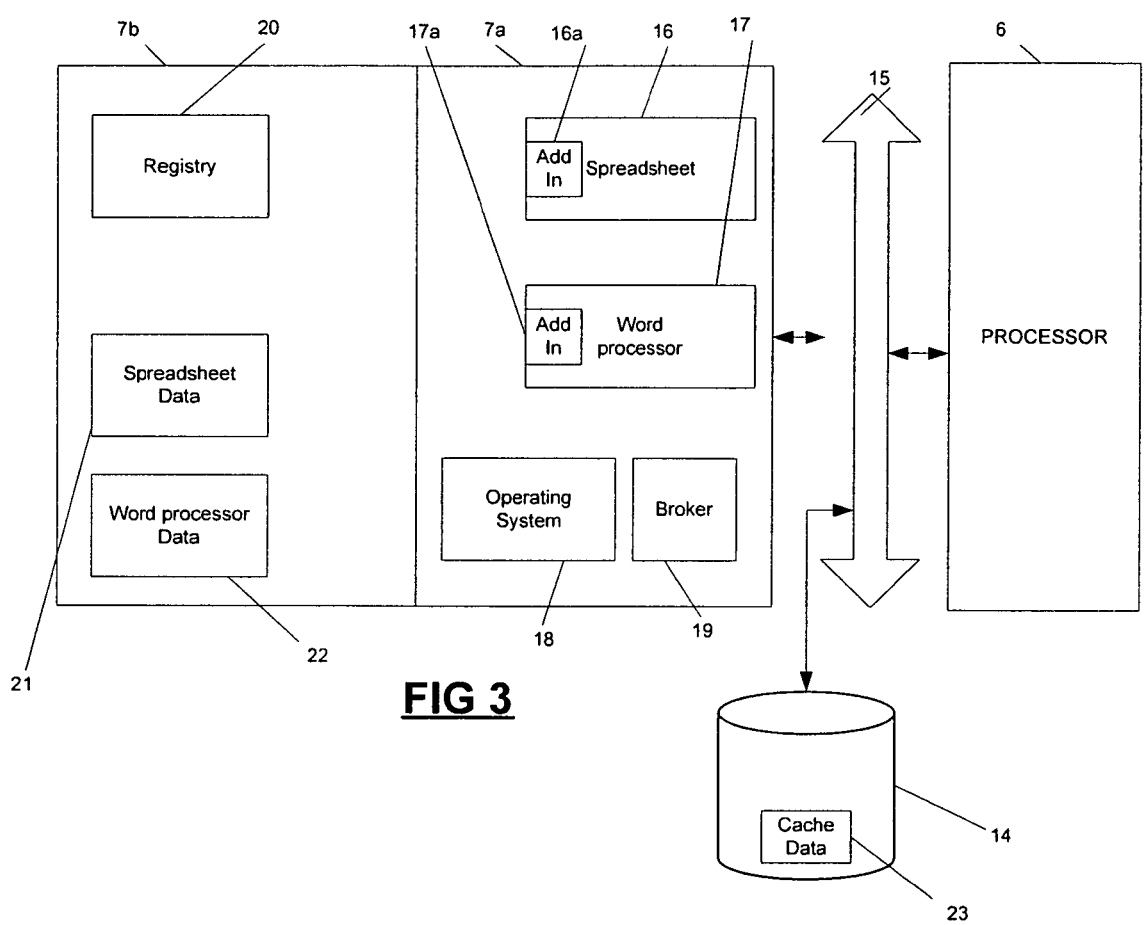
FIG. 3 is a schematic illustration of a configuration for the workstation of FIG. 2.

FIG. 3 schematically illustrates the configuration of the workstation 1 of FIG. 2 when in use running two application programs, a spreadsheet 16 and a word processor 17. It can be seen that the program memory 7a includes program code for the spreadsheet 16, and program code for the word processor 17. It can be seen that the spreadsheet program code includes code for an "add-in" 16a, and that the word processor program code includes code for an "add-in" 17a. These "add-ins" are described in further detail below. The program memory 7a also includes operating system code 18 and code for a broker application 19, the purpose of which is described in further detail below. The data memory 7b includes registry data 20, spreadsheet data 21 and word processor data 22.

In use, program code is read from the program memory 7a by the processor 6 for execution. It should be noted that during execution both the spreadsheet 16 and the word processor 17 will access data stored in the data memory 7*b*. Furthermore, both applications will also access data stored on the hard disk drive 14, which includes a cache 23 for storing cache data, the purpose of which is described in further detail below.

In accordance with the present invention, document data is stored in the database 6 connected to the server 4. In use a user uses an application such as the word processor 17 and requests an appropriate document. This request is passed to the "add-in" 17*a* which communicates the request to the broker 19. Communication between the add-in 17*a* and the broker 19 can conveniently be achieved using the registry 20 as described in further detail below. The broker requests appropriate document data from the database 6, this data is supplied to the broker 19, and copied to the cache 23 on the hard disk drive 14. The "add-in" is then able to access appropriate document data from the cache 23 in the manner described below.

Figure 4:
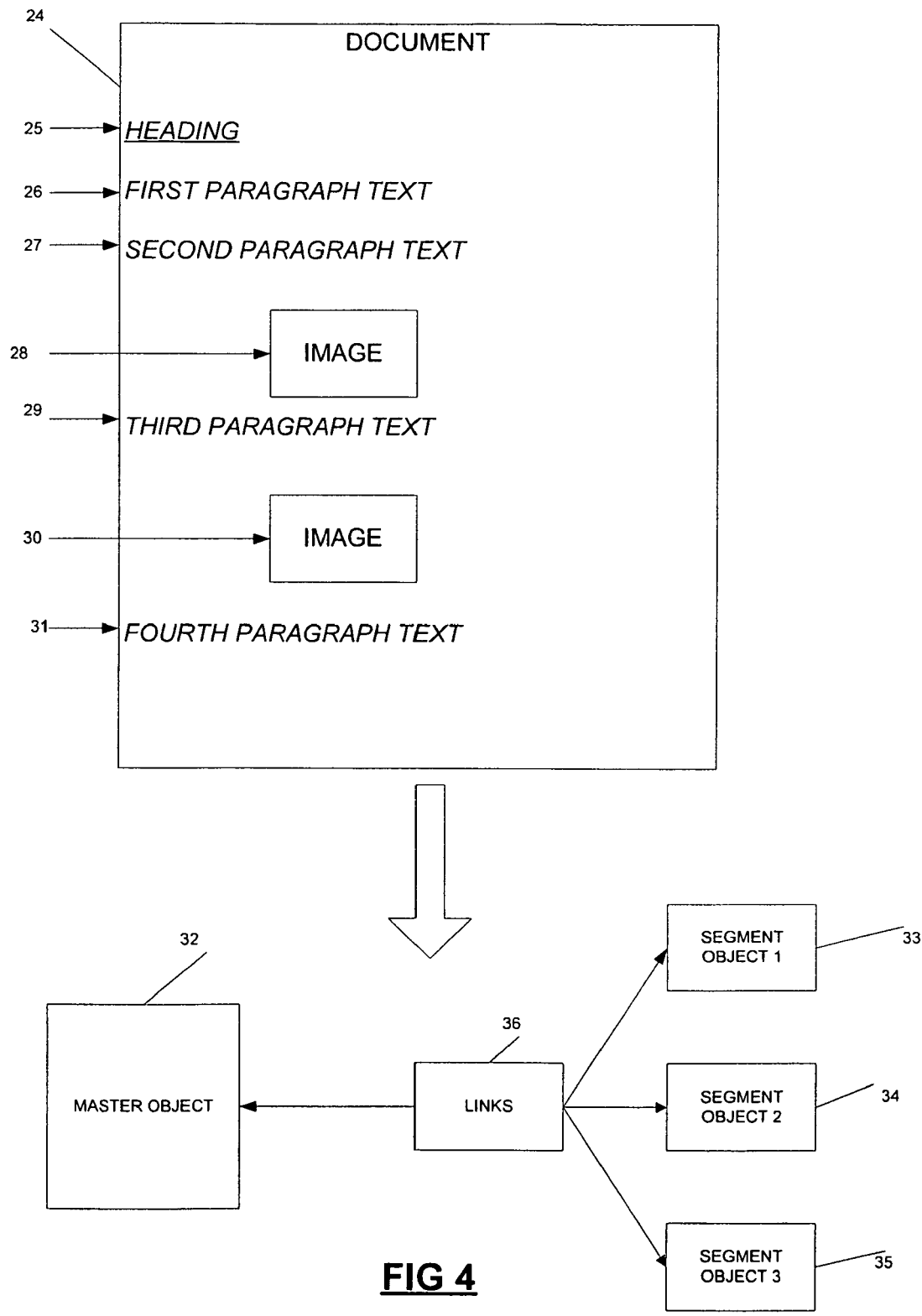
FIG. 4 is a schematic illustration of document management in accordance with an embodiment of the present invention.

FIG. 4 schematically illustrates document management in accordance with the present invention. A document 24 comprises a combination of text and images. The document 24 comprises a heading 25, a first paragraph of text 26 and a second paragraph of text 27. The document 24 also comprises a first image 28, a third paragraph of text 29, a second image 30, and a fourth paragraph of text 31.

In accordance with the present invention, the document 24 is represented as a single master object 32, a first segment object 33, a second segment object 34, and a third segment object 35. The first segment object 33 represents the first paragraph of text 26, the second segment object represents the fourth paragraph of text 31 and the third segment object 35 represents the second image 30. Other components of the document 24 are all represented by the master object 32. That is the heading 25, the second paragraph of text 27, the first image 28, and the third paragraph of text 29 are all represented by the master object 32. A set of links 36 is maintained which indicates how the master object 32 and the segment objects 33, 34, 35 are combined to create the document 24. For example, the set of links 36 will provide details of where within the master object 32 the segment objects 33, 34, 35 should be positioned.

Each segment object may be edited independently of other segment objects, and independently of the master object 32 such that different segment objects may be edited by different users concurrently, thereby allowing a plurality of users to edit different parts of the document 24 concurrently, each user being able to view the complete document. For example, a first user may edit the first paragraph of text 26, while a second user may edit the fourth paragraph of text 31 concurrently.

As described above, document data is stored in the database 6 (FIG. 1). This database is a relational database which uses the structured query language (SQL), and data is stored in tables illustrated in FIGS. 5A to 5M. The stored data is now described.

A master object is represented by a record in a MandorlaObject table 37 which is illustrated in FIG. 5A. The MandorlaObject table 37 comprises an ObjectID field which stores a unique identifier for each object. The ObjectID field is the table's primary key. There will be one entry in this table for each master object represented by data in the database. The MandorlaObject table 37 also com111prises an ObjectName field which stores a textual description of each master object, and an ObjectNotes field which contains notes related to each master object. Both these fields are populated by data input by a user. The MandorlaObject table 37 also comprises an ObjectOwnerID field which contains an identifier for the owner of each master object (by reference to a table containing user details, which is described below). A plurality of different versions of a single master object can be stored, with data in the ObjectVersionID field indicating the current version of each object, by reference to an appropriate table described below.

Referring to FIG. 5B, a MandorlaObjectVersion table 38 is illustrated. It can be seen that this table comprises an ObjectID field and an ObjectVersionID field which together form the primary key of the MandorlaObjectVersion table 38. There will be one entry in the MandorlaObjectVersion table 38 for each version of each master object represented by data in the database 6. A VersionChangeNotes field contains textual data input by a user for each master object version. A DateTimeStamp field contains time and date data indicating the date on which each master object version was created. A UserLockedToID field is used to store data for each object indicating a user, if any, by whom each master object version is currently locked. A LastUpdate field stores time and date data indicating the time and date on which each master object version was last updated. An ObjectOwnerID field identifies the owner of each master object version by reference to entries in the table containing user details, described below. A CheckInNotes field contains textual information input by a user when each master object version was added to the database 6, and a CheckOutNotes field contains textual information input by a user when each master object version is removed from the database 6 for editing. A LockStatus field indicates whether or not each master object version is currently locked. A UserIDAssignedTo field comprises a list of UserIDs for each master object version indicating which user (s) can access each master object version. Again, entries in this field link to entries in the table containing user details described below. A SequenceCount field for each object version is incremented each time each master object version is saved, and this field is used for audit purposes. An ObjectVersionNo field indicates a version number for each master object version (e.g. a textual version identifier). An ObjectStatus field indicates the status of each object version. Possible statuses include locked, published, and suspended. These are described in further detail below.

The MandorlaObject table 37 and the MandorlaObjectVersion table 38 contain administrative data relating to master objects and different versions of master objects. The data of each master object (e.g. the text or image data) is stored as an entry in a MandorlaObjectBlob table 39, which is illustrated in FIG. 5C.

The MandorlaObjectBlob table 39 has a primary key made up of an ObjectIDField and an ObjectVersionID field, that is the MandorlaObjectBlob table 39 has the same primary key as the MandorlaObjectVersion table 38. The MandorlaObjectBlob table also comprises an ObjectImage field which is used to store data which makes up each master object version, and a LastUpdate field which stores time and data indicating when the blob data was last updated.

In some embodiments of the invention, instead of storing data in the ObjectImage field described above, the MandorlaObjectBlob table contains pointers to files containing the appropriate data. Such pointers can be stored in ObjectLocalFileName and ObjectContainerFileName fields in the MandorlaObjectBlob table 39.

It has been explained above that the ObjectOwnerID field of the MandorlaObject table and the UserIDLockedTo, ObjectOwnerID and UserIDAssignedTo fields of the MandorlaObjectVersion table reference a table containing user details. A MandorlaUser table 40 (FIG. 5D) containing such details is now described. This table has a UserLoginID field as its primary key. The table also comprises a UserID field which stores a unique identifier for each user of the system. It is this field which is referenced by fields of the MandorlaObject and MandorlaObjectVersion tables described above. The MandorlaUser table additionally includes UserName and Password fields which contain log on information for each user, an email field containing an email address for each user, and a UserPrivilegeLevel field which contains data indicating each user's access privileges.

From the preceding description it can be seen that the MandorlaObjectTable 37, the MandorlaObjectVersion table 38 and the MandoralObjectBlob table 39 together contain all data necessary to represent master objects stored within the database 6. Segment objects are referred to as shared objects within the database 6, and are represented by a MandorlaSharedObject table 41 (FIG. 5E) and the MandorlaSharedObjectBlob table 42 (FIG. 5F). Details of these tables are now described.

Referring first to FIG. 5E, the MandorlaSharedObject table 41 is illustrated. This table comprises a SharedObjectID field, which provides a unique identifier for each segment object stored in the database, and a SharedObjectVersionID field, which provides a version identifier for each record. These two fields together make up the MandorlaSharedObject table's primary key. It can be seen that using these two fields, a plurality of different versions of a segment object can be stored in the MandorlaSharedObject table. Each version of a particular segment object will have a common SharedObjectID value, but a different SharedObjectVersionID value.

The MandorlaSharedObject table 41 additionally includes a SharedObjectDesc field which is used to store a textual description of the shared object input by a user, and a SharedObjectName filed which includes a textual name for each segment object, as input by a user. The data stored in these fields is common to all versions of a particular segment object. The MandorlaSharedObject table additionally comprises LastUpdate, UserIDAssignedTo, CheckOutNotes and CheckInNotes fields, all of which contain data relating to segment object versions corresponding to the data relating to master object versions stored in similarly named fields of the MandorlaObjectVersion table 38. The MandorlaSharedObject table also comprises a SharedObjectOwnerID field which contains a UserID for the owner of each segment object version, which can be used to obtain user details from the MandorlaUser table 40 described above. VersionName and VersionNotes fields again contain textual information input by a user relating to each segment object version. A UserIDLocked to contains a UserID, if any, for a user by whom each segment object is currently locked, and this field again references the MandorlaUser table 40. A SharedObjectVersionNo field indicates the version number of each record in the table. A LockStatus field indicates whether or not each segment object version is currently locked.

In some circumstances it will be necessary to store multiple copies of a single segment object version. A SharedObjectType field contains data indicating whether or not each record relates to an original segment object version, or a copy of a shared object version for. If a segment object has a plurality of copies, each record shows details of users having copies in a CopySharedObjectUserID field which contains a list of UserIDs for each segment object version indicating which users have copies of that segment object version. A SharedObjectStatus field indicates the status of each segment object version, and this field can be used to indicate whether or not each object version has a plurality of copies which need to be merged.

The MandorlaSharedObjectBlob table 42 (FIG. 5F) has a SharedObjectID field and a SharedObjectVersionID field as its primary key. That is, the MandorlaSharedObjectBlob table 42 and the MandorlaSharedObject table 41 have a common primary key, providing a one to one mapping between records in these tables. The MandorlaSharedObjectBlob table 42 contains the data (e.g. text or image data) of each segment object version. This data is stored in a SharedObjectImage field. In alternative embodiments of the present invention, the data may be stored in files instead of within the MandorlaSharedObjectBlob table, and in such embodiments a SharedObjectLocalFileName field provides pointers to appropriate files.

As described above with reference to FIG. 4, means are required to associate each segment object version represented by a record in the MandorlaSharedObject table 41 with one or more master object versions represented by records in the MandorlaObjectVersion table 38. This is achieved using a MandorlaLinkedObjects table 43 which is illustrated in FIG. 5G.

The MandorlaLinkedObjects table contains one entry for each link between a segment object and a master object, and has an ObjectLinkID field as its primary key. The table includes ObjectID and ObjectVersionID fields which can together be used to reference a unique record in the MandorlaObjectVersion table 38. The table also includes SharedObjectID and SharedObjectVersionID fields which can together be used to reference a unique record in the MandorlaSharedObject table 41. Thus, these four fields establish a link between a particular master object version and a particular segment object version. ObjectVersionNo and SharedObjectVersionNo fields contain data corresponding to the correspondingly named fields of the MandorlaObjectVersion and the MandorlaSharedObject tables respectively, thus providing some redundancy. BookMark, StartPos and EndPos fields are collectively used to indicate how the identified segment object version should be combined with the master object version, and this data is described in further detail below. A LastUpdate field contains time and date data indicating the last update of each segment object version contained in the table and a SequenceCount field is used in the same way as the corresponding field of the MandorlaObjectVersion table 28. A HasCopySharedObject field contains a Boolean value indicating whether or not the shared object version has a corresponding copy and a CopySharedObjectOwnerID field contains details of all users having a copy of the shared object version.

Referring to FIG. 5H a MandorlaCopySharedObject table 44 is illustrated which stores one record for each copy of a segment object version. This table includes a CopyObjectID field which is the table's primary key. MasterSharedObjectID and MasterSharedObjectVersionID fields together identify a record in the MandorlaSharedObject table 41 which represents the master copy of a segment object version. CopySharedObjectID and CopySharedObjectVersionID fields together identify a record in the MandorlaSharedObject table which represents the copy of the segment object version identified by the MasterShaedObjectID and MasterSharedObjectVersionID fields. A MasterSharedObjectOwnerID field identifies the user who created the master copy of the segment object version (by reference to the MandorlaUser table 40) and a CopySharedObjectOwnernID field identifies the user who created the copy of the segment object version.

The database can in some embodiments store template data which can be used to format documents created using application software. Such templates can include a "Normal.dot" template for use with the Microsoft™ Word™ word processor. Such data is stored in a MandorlaGlobalTemplate table 45 (FIG. 5I) and a MandorlaWordTemplate table 46 (FIG. 5J).

The MandorlaGlobalTemplate table 45 contains a GlobalTemplateID field which is the table's primary key. A name for each template is stored in a GlobalTemplateName field, and data representing each template is stored in a GlobalTemplateImage field. A DateTimeStamp field can be used to stored data indicating when each template was last updated. In use the MandorlaGlobalTemplate table 45 contains a single record which, in the case of the Microsoft™ Word™ word processor represents a "Normal.dot" template.

The MandorlaWordTemplate table 46 stores specific template data for use with the Microsoft Word application. A TemplateID field acts as the table's primary key. A TemplateName field contains text data representing a template's name, and a TemplateNotes field which contains notes for each template. A TemplateImage field is used to store data which represents each template. In use, the MandorlaWordTemplate table is used to provide templates for particular document types which can be used instead of the normal dot template provided by the MandorlaGlobalTemplate table 45.

FIG. 5K illustrates a MandorlaUserAccess table 47 which indicates access rights granted to users having records in the MandorlaUser table 40. The MandorlaUserAccess table has a UserID field as its primary key, and thus entries in the MandorlaUserAccess table can be accessed using data stored in the UserID field of the MandorlaUser table 40. The MandorlaUserAccess table comprises a plurality of fields which indicate which master and shared objects can be accessed by which users, and these fields also indicate the extent of each user's permissions (e.g. read only, read/write).

FIG. 5L illustrates a MandorlaApplicationLog table 48 which is used to provide audit trail functionality. The table comprises a LogID field which is its primary key. ObjectID and ObjectVersionID fields are used to identify a particular master object version, while SharedObjectID and SharedObjectVersionID fields are used to identify a particular segment object version. Some entries may relate only to a segment object or only to a master object, and in such cases one of these pairs of fields will not be populated. A UserID field identifies a user whose actions created the log record and a LogText field contains free form text which forms the heart of the log record. A DateCreated field contains time and date data indicating when each log record was created and a VersionNo field which indicates each entry's current version number.

FIG. 5M illustrates a MandorlaAudit table 49, which has a field AuditID as its primary key. This table is used to record errors. An AuditUserID field stores a UserID of a user to whom the error was presented, an AuditMessage field stores details of the error, and a DateCreated field stores time and date data indicating when the error occurred.

Figure 6:
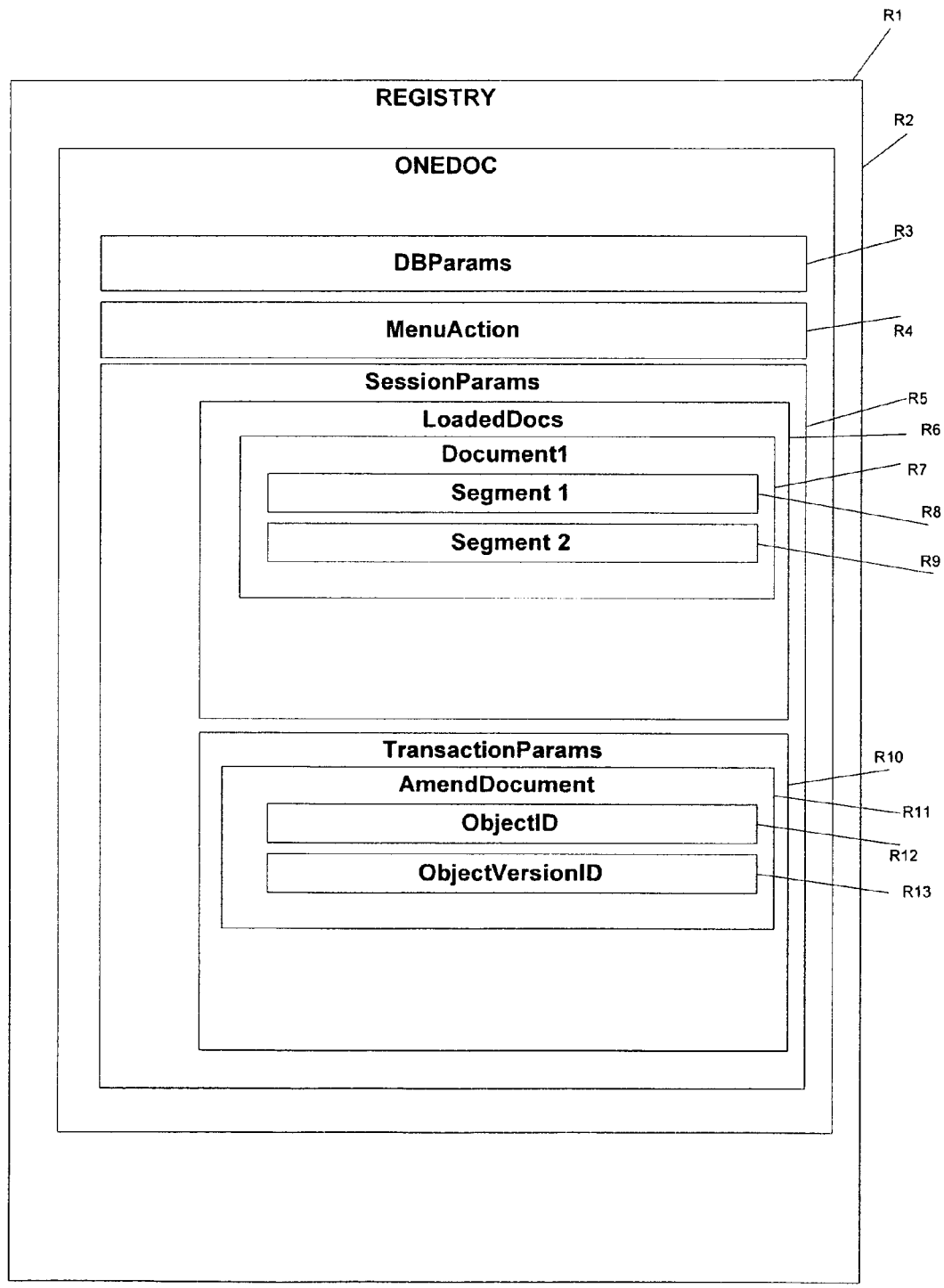
FIG. 6 is a schematic illustration of a structure for the registry of FIG. 2.

It has been mentioned above that communication between the add-ins 16a, 17a and the booker 19 (FIG. 3) can conveniently be achieved via a registry file 20 which is at run time stored in the data memory 7b. Such a registry file is a core component of Microsoft™ Windows™ operating systems. In order to communicate data in this way a number of keys must be established within the registry into which data may be placed by a sender, and removed from by a receiver. A suitable registry structure is illustrated in FIG. 6. Communication between the broker 19 and the add-in 17a is described below, although it will be appreciated that communication between the broker 19 and the add-in 16a will be very similar.

A Registry R1 is arranged hierarchically and includes registry keys relating to the system described herein within a OneDoc folder R2 together with various other data relating to other applications (not shown). The OneDoc folder R2 comprises a DBParams registry key R3. This contains a single ConnectionString field which specifies a full path name for the database 6. The OneDoc folder R2 additionally comprises a MenuAction registry key R4 which has a single MenuAction field which is used to store details of a last menu action selected by a user from a menu provided the add-in 17a. A SessionParams registry key R5 comprises an isServerBusy field indicating whether the broker 19 is currently busy, an isClientBusy field indicating whether the add-in is busy, an isServerLoaded field indicating whether the broker is loaded and an isClientLoaded field indicating whether the add-in is loaded.

A LoadedDocs registry key R6 is used to store details of documents loaded onto the workstation 1. This comprises a document folder R7 containing data relating to Document1, and the document folder R7 in turn contains two segment folders R8, R9 which contain data relating to Segment1 and Segment2 which are included within Document1. The data relating to Document1 (and all other documents for which details are included in the LoadedDocs registry key) will include an ObjectID, ObjectName and ObjectVersionID for the master object, together with a file name where document data (from the MandorlaBlob table) relating to Document1 is stored within the cache 23. The Document folder R7 is identified using a combination of the ObjectID and the ObjectVersionID taken from the database 6. Each segment folder R8, R9 is identified using a combination of a SharedObjectID and a SharedObjectVersionID, and each segment folder comprises an ObjectLinkID (identifying a record in the MandorlaLinkedObjects table which links the segment object to the master object), a SharedObjectID, a SharedObjectVersionID and a SharedObjectName. Again, a file name is also stored indicating where within the cache 23 data relating to the segment object can be found.

The SessionParams registry key R5 additionally comprises a TransactionParams folder R10 which contains data relating to transactions between the broker 19 and the add-in 17a. An AmendDocument registry key R11 is illustrated in FIG. 6, and this key includes an ObjectID field R12 and an ObjectVersionID field R13. Use of registry data is described in further detail below.

Figure 7:
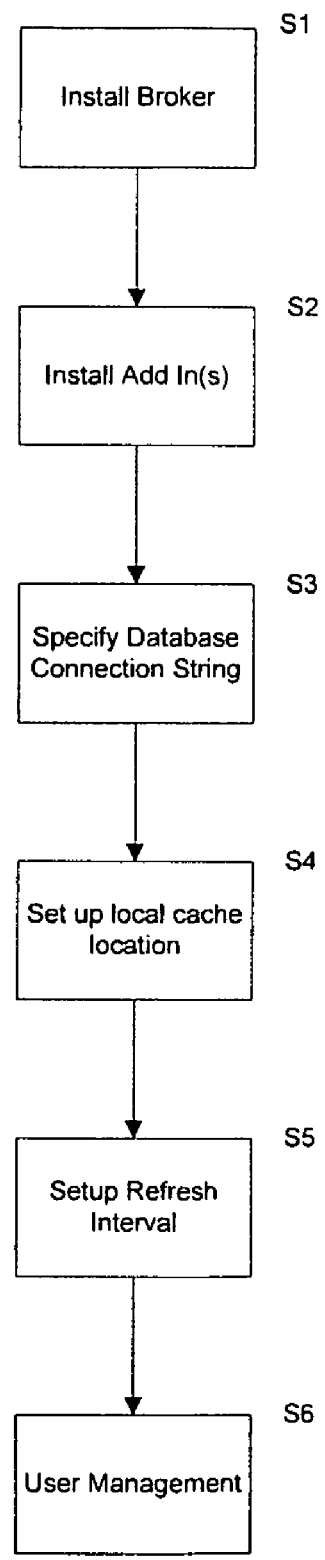
FIG. 7 is a flowchart showing steps taken to configure a system operating in accordance with an embodiment of the present invention.

Having described data stored within the tables of the database 6 and data stored within the registry R1, installation and configuration of the system is now described with reference to FIG. 7. At step S1 the broker 19 (FIG. 3) is installed onto a hard disk drive connected to the workstation. This installation process will typically involve copying one or more files from a data carrier such as a CDROM onto the hard disk drive. Similarly, at Step S2 each of the "add-ins" 16a, 17a is installed onto the hard disk drive in a similar manner. It will be appreciated that the broker 19 must be provided with a path for the database 6, and this is set at step S3. Similarly a path name for local cache data 23 (FIG. 3) is set at step S4. At step S5 parameters are set indicating how often the broker 19 should monitor the database 6 for updated data, and at step S7, user management configuration (e.g. creation of user names/passwords) is carried out.

Much of the configuration described above with reference to FIG. 7 is achieved using a dialog box provided by the broker 19 which is illustrated in FIGS. 8 to 11.

Figure 8:
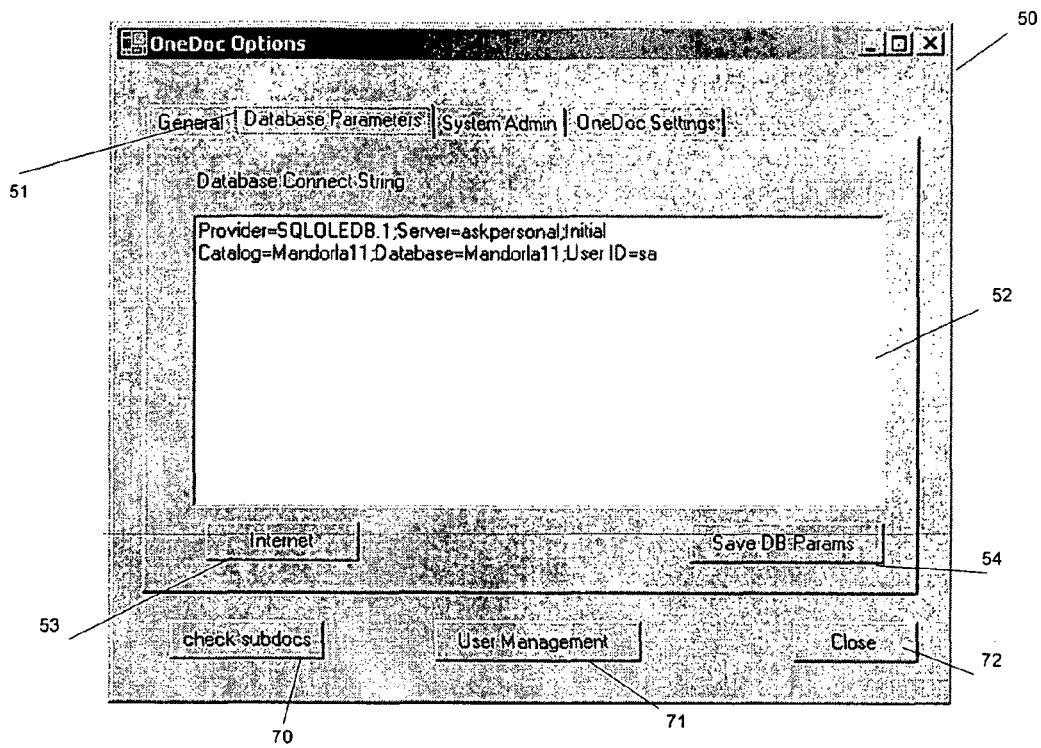
FIGS. 8 to 11 are screenshots showing dialog boxes used in the configuration process of FIG. 7.

Referring to FIG. 8, a dialog box 50 used for configuration of the broker is illustrated. It can be seen that this dialog box comprises four tabs, and each tab allows different configuration data to be specified. A Database parameters tab 51 is illustrated in FIG. 8. This allows a database connection string to be entered in a text input area 52. An Internet button 53 can be used to browse the Internet for the database. When the text input area 52 contains the correct connection string, a Save DB Params button 54 is used to save the entered connection string, and the appropriate data is then set in the DBParams registry key R3 (FIG. 6).

Figure 9:
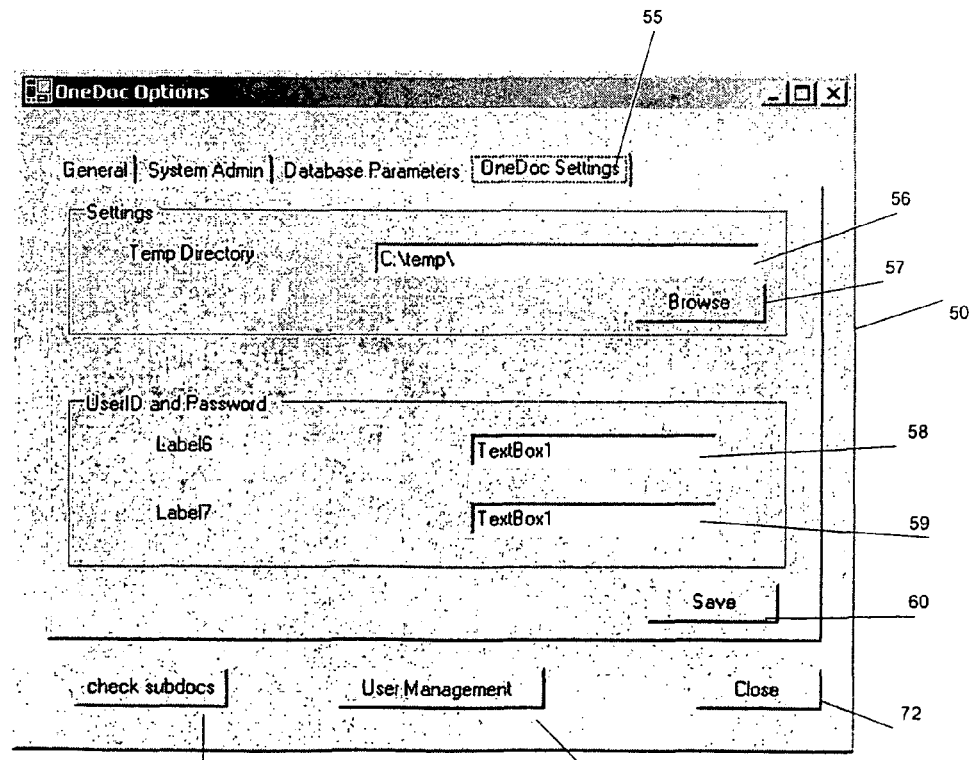

FIG. 9 illustrates a "OneDoc Settings" tab 55 of the dialog box 50. A field 56 is provided into which a directory path name can be entered where cache data 23 (FIG. 3) is stored. A Browse button 57 allows a suitable location to be found. In order to change the location in which cache data is stored, a user may be required to enter a username in a text field 58 and a password in a text field 59, with the user being allowed to change the cache location only if the input data is successfully validated against data stored in the MandorlaUser table 40. The directory path name entered in the textbox 56 is set by using a Save button 60.

Figure 10:
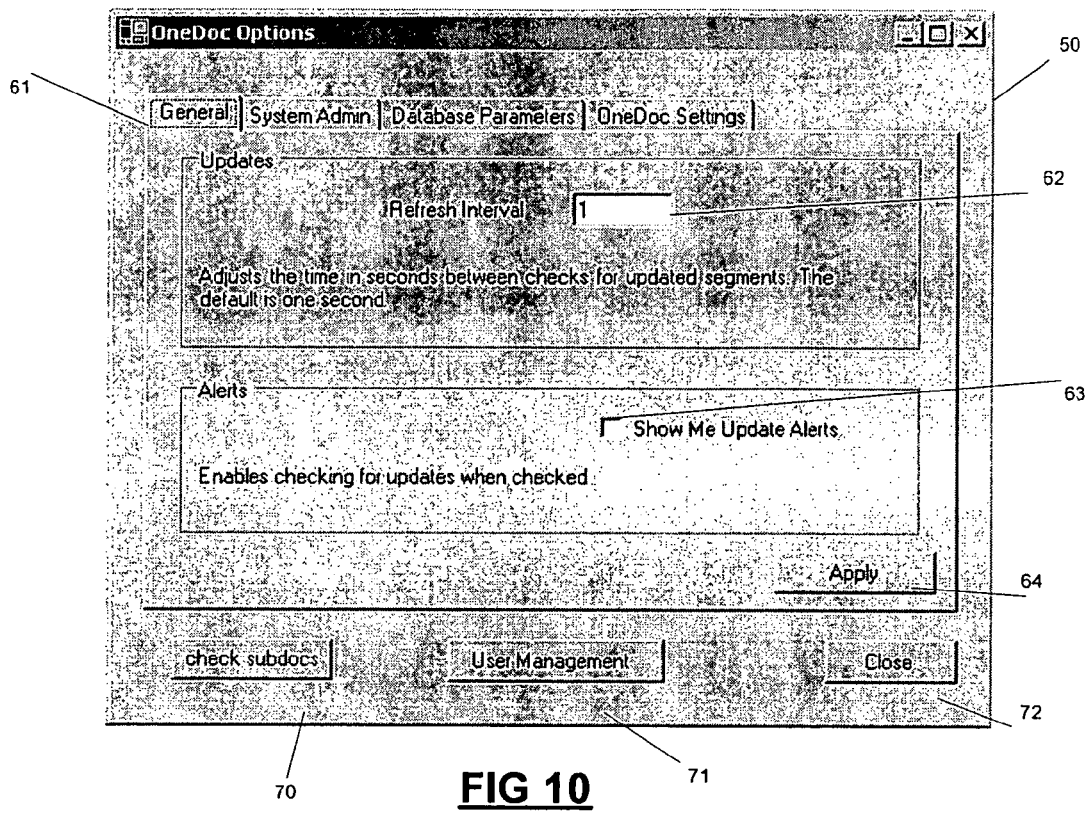

FIG. 10 illustrates a General tab 61 of the dialog box 50. This allows refresh interval to be specified in a text field 62, and alerts to be requested using a tick-box 63. The values set may be applied using an apply button 64. These settings determined how frequently the broker 19 checks the database 6 for new data, and the manner in which new data is reported to the user, as is described in further detail below.

Figure 11:
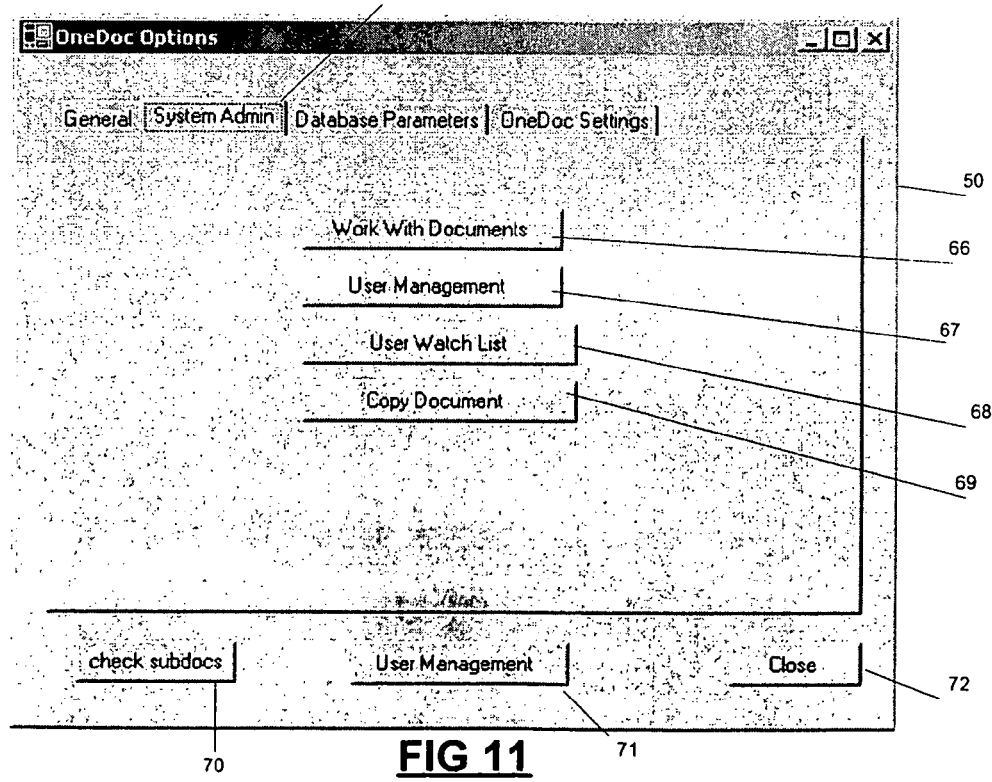

FIG. 11 illustrates a SystemAdmin tab 65 of the dialog box 50. This tab allows a variety of administrative tasks to be carried out using a Work With Documents button 66, a User-Management button 67 a User Watch List button 68 and a Copy Document button 69. The Work With Documents button 66 allows details of documents stored in the database 6 to be viewed and edited. The UserManagement button 67 allows user details such as user names and passwords to be edited. A UserWatchList button 68 allows configuration of master and segment objects within the database with which a user is associated, such that changes to these objects are notified to the appropriate user. The Copy Document button 69 allows a copy of a document stored in the data base 6 to be created, as is described in further detail below.

It can be seen from FIGS. 8 to 11 that the dialog box 50 also includes a User Management button 70 which performs the same function as the User Management button 67 described above, a check subdocs button 71 and a close button 72.

Having installed and configured the software as described above, and assuming an architecture as illustrated in FIG. 3, a user using the workstation 1 may use the system relatively seamlessly in combination with application software such as the Microsoft™ Word™ word processor. On loading Word, the user is presented with a conventional Microsoft™ Word™ window including an area for text entry and a plurality of toolbars at the top of the window. Part of such a window is illustrated in FIG. 12.

Figure 12:
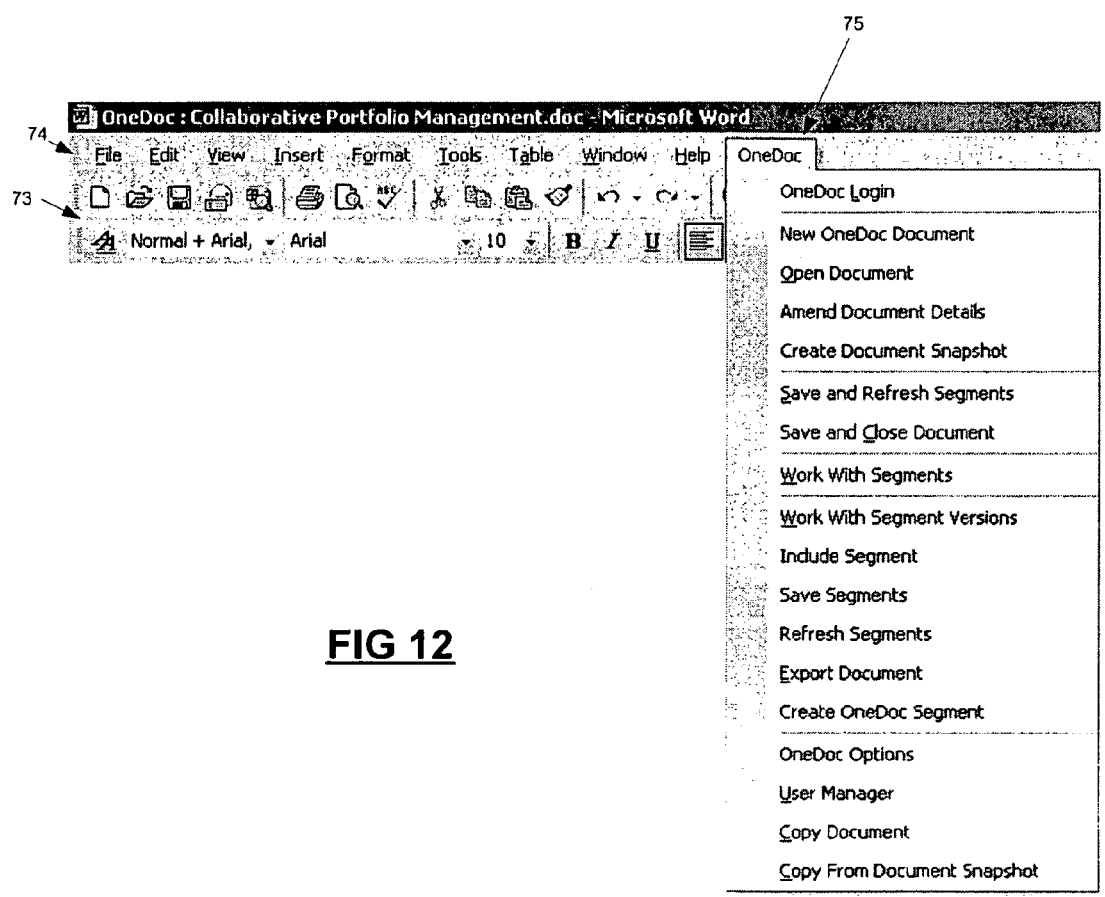
FIG. 12 is a screenshot of a menu provided by a preferred embodiment of the present invention.

Referring to FIG. 12, it can be seen that the Microsoft™ Word™ window comprises toolbars 73 and a menu bar 74. In addition to menus conventionally provided by Microsoft™ Word™ the menu bar 74 additionally comprises a OneDoc menu 75. The OneDoc menu 75 is used to access and manipulate master and segment objects stored in the database 6. The OneDoc menu 75 is provided by the add-in 17a which operates alongside the word processor. The add-in 17a is written in the VisualBasic programming language in a manner such that seamless integration with the Microsoft Word word processor is achieved.

Initially, the user selects a OneDocLogin option from the OneDoc menu 75 to log in to the system. Selecting this option presents the user with a dialog box into which user name and password details are entered. These details are communicated to the broker 19 (via the registry) and verified against data in the MandorlaUser table 40 in the database 6.

Figure 13:
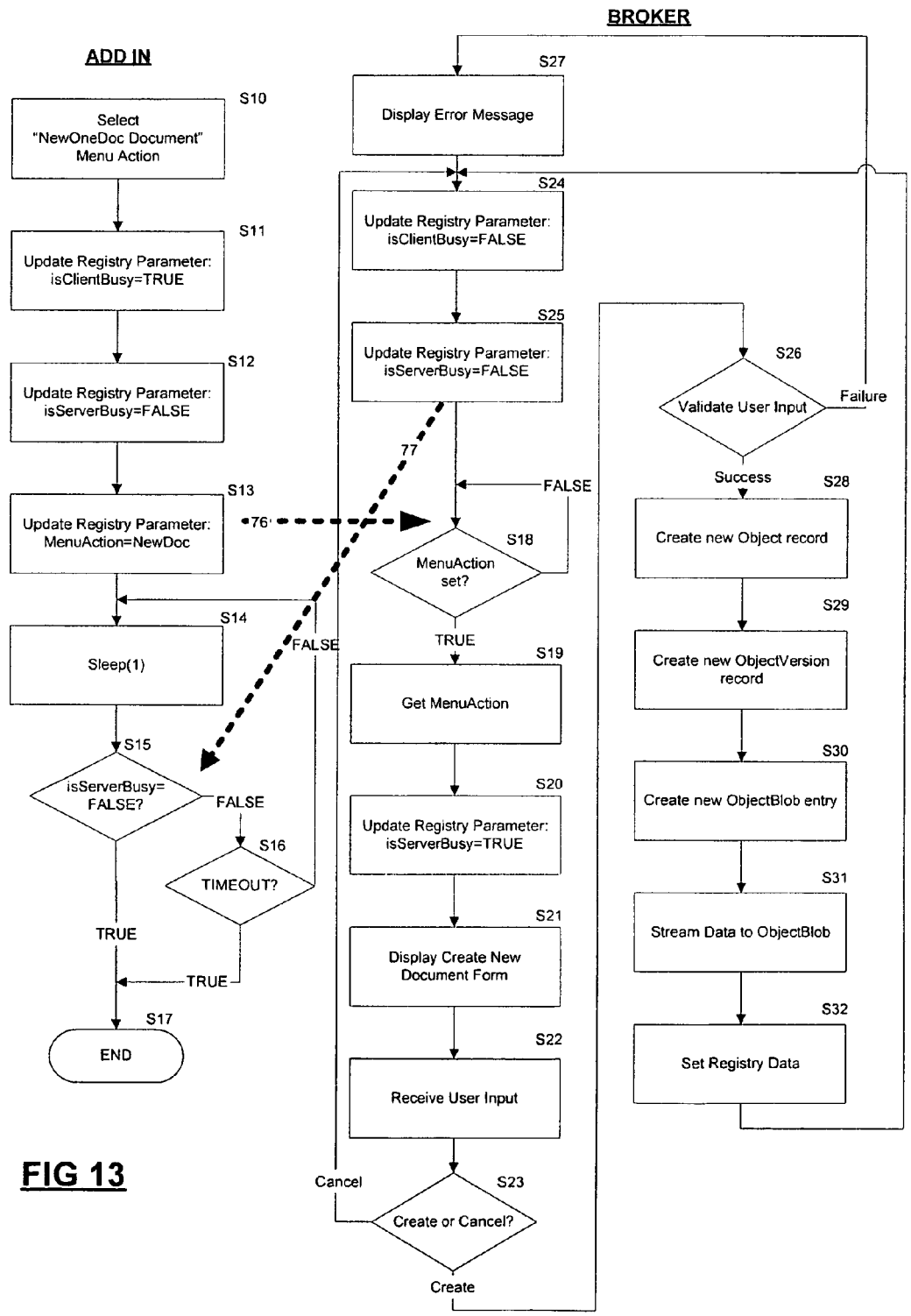
FIG. 13 is a flowchart of a document creation process in accordance with an embodiment of the present invention.

When a user has successfully logged on, a new document can be created, which is stored in the database 6 as a master object and one or more segment objects. Such a document is herein referred to as a OneDoc document. Creation of a new OneDoc document is now described with reference to FIG. 13.

A new document is created by selecting a "New OneDoc Document" option from the OneDoc menu 75 at step S10. The add-in 17a then sets the isClientBusy field within the SessionParams registry key R5 (FIG. 6) to TRUE at step S11 and sets the isServerBusy field within the SessionParams registry key R5 to FALSE at step S12. Additionally, the add-in 17a sets the MenuAction registry key R4 to "NewDoc" at step S13. Having set the registry variables described above, the add-in 17a executes a sleep command specifying a time parameter of one second at step S14, and then loops until the isServerBusy field within the SessionParams registry key becomes FALSE (described below). The value of the isServerBusy field is checked at step S15, and if the value is not yet set to FALSE execution passes to step S16 where it is ensured that the total time spent executing the loop does not exceed a predetermined timeout limit. Assuming that the timeout limit has not been reached, execution returns to step S14 and the loop continues. When either the isServerBusy variable is set to FALSE (detected at step S15) or the timeout limit is reached (detected at step S16) processing within the add-in 17a in response to the menu selection ends at step S17.

When not processing requests, the broker 19 routinely polls the isClientBusy variable in a loop at step S18 which continues until MenuAction is set to a non-NULL value. When MenuAction is found not to be NULL, processing begins within the broker 19. Thus, in the scenario of FIG. 13, shortly after the Menu Action parameter is set by the add-in 17a step S13 the broker begins processing. This is schematically illustrated by an arrow 76 in FIG. 13.

Figure 14:
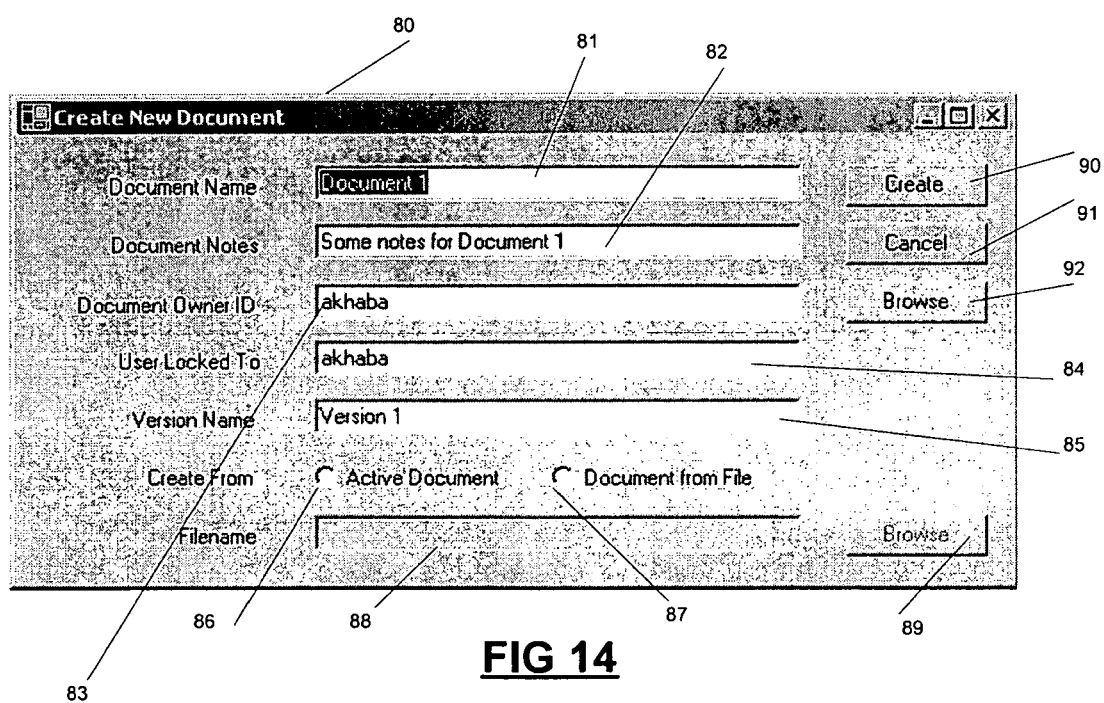
FIG. 14 is a screenshot of a dialog box used in the document creation process of FIG. 13.

At step S19 the MenuAction registry key is interrogated to obtain the last menu action performed. Assuming that this MenuAction is a new document menu action, the isServerBusy registry field is set to TRUE at step S20, and the broker 19 displays a create new document dialog box 80 at step S21 which is illustrated in FIG. 14. It can be seen that the create new document dialog box comprises a plurality of fields into which text can be entered by a user. A document name field 81 allows a name to be specified for the document to be created, and appropriate notes can be entered into a document notes field 82. A document owner ID field 83 indicates a UserID for the owner of the document to be created, and a user locked to field 84 contains a UserID for a user to whom the created document is initially locked. A Version name field 85 is used to specify a name for the document version to be created. All the fields described above are initially populated with default values, although these can be edited by a user as necessary.

Additionally, the create new document dialog box 80 includes a pair of radio buttons. If a first radio button 86 is selected the new document is created from the document currently loaded into the Word™ application. If a second radio button 87 is selected the new document is created from a file specified in a file name field 88. A browse button 89 can be used to locate the file for specification in the file name field 88. As shown in FIG. 14, until the second radio button 87 is selected the file name field 88 and the browse button 89 are greyed out and inaccessible to the user.

Having entered appropriate data into the fields described above, a create button 90 can be used to create the document. A cancel button 91 is also provided to cancel the new document operation. A browse button 92 allows a user to browse details of users specified within the MandorlaUser table, and allocate access rights to the created document to various of these users.

Referring again to FIG. 13, at step 22 the data input to the dialog box 80 is received by the broker. At step S23, the broker checks whether the user used the create button 90 or the cancel button 91. If the cancel button 91 was used, the operation terminates, and execution passes to step S24 where the isClientBusy parameter is set to FALSE, and then step S25 where isServerBusy parameter is set to FALSE. Execution then returns to step S18. If step S23 determines that the create button 90 of the dialog box 80 was used, the data input by the user is validated as step S26. If validation is not successful, an error message is displayed to the user at step S27, and execution again passes to step S24.

If validation is successful execution passes to step S28 where the broker 19 issues a command to the database 6 (located using the DBParams registry key R3) to create a new record in the MandorlaObject table 37. The ObjectID field is automatically generated by the database and this ObjectID is provided to the broker 19 by the database 6. The ObjectName, ObjectOwnerID, and ObjectNotes fields are populated with data entered into corresponding fields of the dialog box 80.

At step S29 the broker 19 issues a command to the database 6 to create a record in the MandorlaObjectVersion table 38, in which the ObjectID value is the same as that of the record created in the MandorlaObject table 37. The ObjectVersionID value is automatically set by the database 6 and this value is returned to the broker 19, and is also entered into the ObjectVersionID field of the appropriate record in the MandorlaObject table 37. The DateTimeStamp and LastUpdated fields of the record created in the MandorlaObjectVersion is populated with the time and date of creation The UserIDLockedTo and ObjectOwnerID fields are set to values specified in the dialog box 80. The SequenceCount and ObjectVersion fields are set to an initial value (e.g. '0' or '1').

Having created an appropriate record in the MandorlaObjectVersion table S28, the broker 19 issues a command to create a record in the MandorlaObjectBlob table 39 at step S30. The created record has its ObjectID and ObjectVersionID fields set to the same values as the corresponding fields of the MandorlaObjectVersion table 38. Having created a record in the MandorlaObjectBlob table, the data specified in the dialog box 80 is streamed into the ObjectImage field of the MandorlaObjectBlob table 39 at step S31. Streaming data can either involve reading data from a file specified in the text field 88 of the dialog 80 (if the second radio button 87 is selected), or alternatively can involve streaming data from the main Microsoft Word application. Given that the created document is loaded into the Microsoft Word application, registry data is updated for use by the addin 17a at step S32. The LoadedDocs registry key R6 is populated with ObjectID, ObjectName, and ObjectVersionID values, all stored within a document folder within the LoadedDocs registry key R6 which is named using a combination of ObjectID and ObjectVersionID. Given that, initially, the document contains no segment objects, the document folder contains no segment folders of the type described above.

Execution then passes to step S24 where isClientBusy is set to FALSE, then to step S25 where isServerBusy is set to false, and control then returns to step S18 where the next client activity is awaited.

It should be noted that by setting isServerBusy to FALSE at step S25, the condition of step S15 will evaluate to true, allowing processing within the add-in to terminate at step S17. This is schematically illustrated by an arrow 77 in FIG. 13.

Figure 15A:
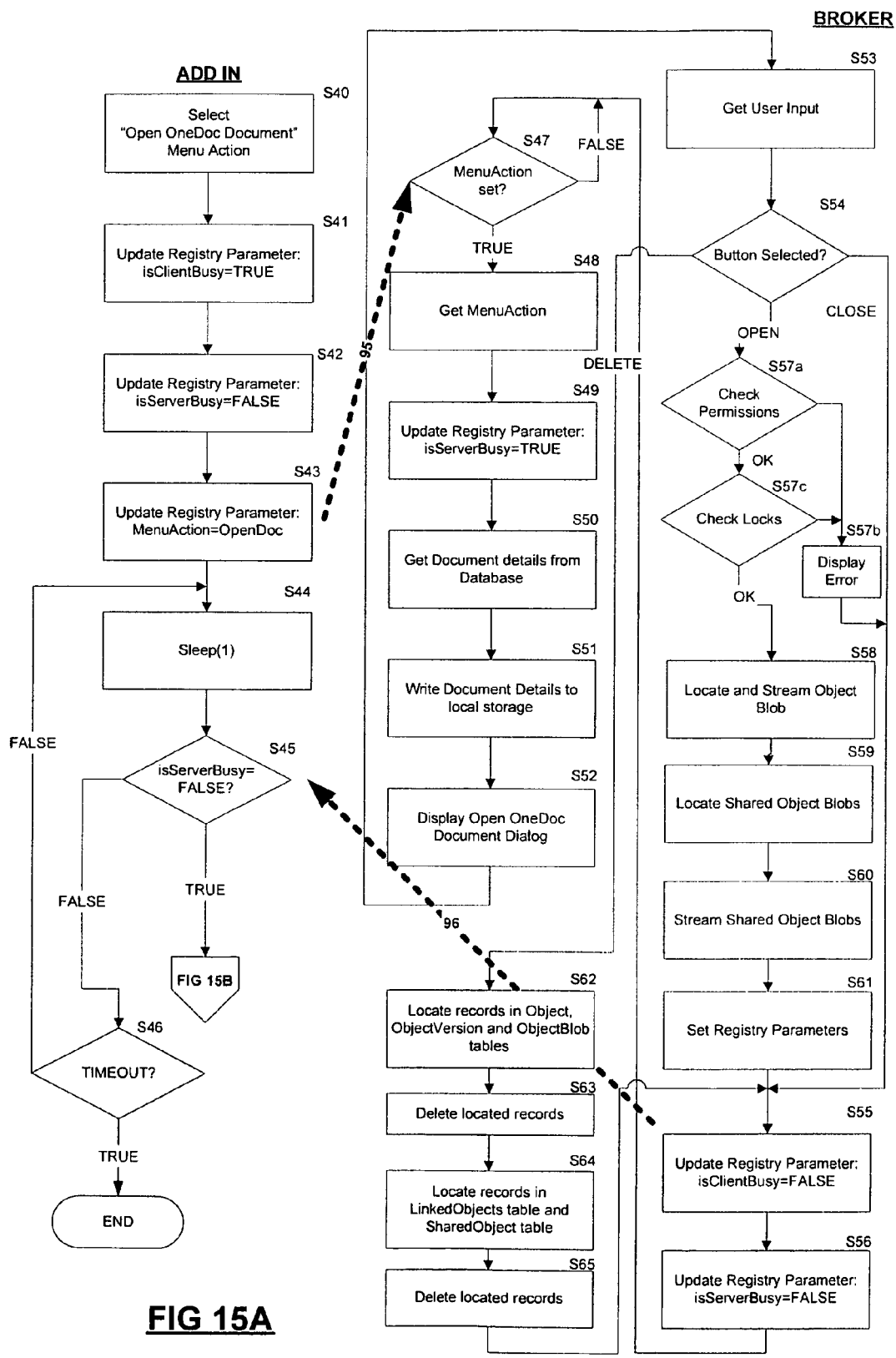
FIGS. 15A and 15B are flowcharts of an open document process in accordance with an embodiment of the present invention.

Referring back to FIG. 12, the OneDoc menu 75 also includes an open document option, and when this is selected, a sequence of events illustrated in the flowchart of FIG. 15A takes place. The flowchart of FIG. 15A begins at step S40 with selection of the Open Document option from the OneDoc menu 75. Following this selection the isClientBusy registry field is set to TRUE at step S41, and the isServerBusy registry field is set to FALSE at step S42. At step S43 the MenuAction registry key is set to an appropriate value. The add-in then executes a sleep command at step S44 and processing within the add-in then enters a loop (step S45) until the isServerBusy field is set back to FALSE. Step S46 provides a timeout check as described with reference to step S16 of FIG. 13.

Again, setting the MenuAction parameter at step S43 allows the broker 19 to leave a loop established by step S47 (denoted by an arrow 95). The broker 19 obtains details of the menu action from the appropriate registry key at step S48, and then updates the isServerBusy field to TRUE at step S49.

At step S50, the broker 19 interrogates the database 6 and obtains details of all documents represented by a record in the MandorlaObject table 38, and the ObjectVersionID field of each record is used to identify the current version of each document. The ObjectIDs and ObjectVersionIDs obtained in this way are used to perform a lookup in the MandorlaObjectVersion table 39 and data relevant to each object (e.g. document name, and document notes) is passed to the broker 19.

The ObjectIDs and ObjectVersionIDs are also used to perform a look up in the MandorlaLinkedObjects table 43, which may return one or more pairs of SharedObjectID and SharedObjectVersionID. Each pair of values returned in this way is then used to perform a lookup in the MandorlaSharedObjects table 41, and data relating to the segments objects contained within the documents within the database 6 is passed to the broker 19. All data received from the database 6 is written to the hard disk drive 14 at step S51.

Figure 16:
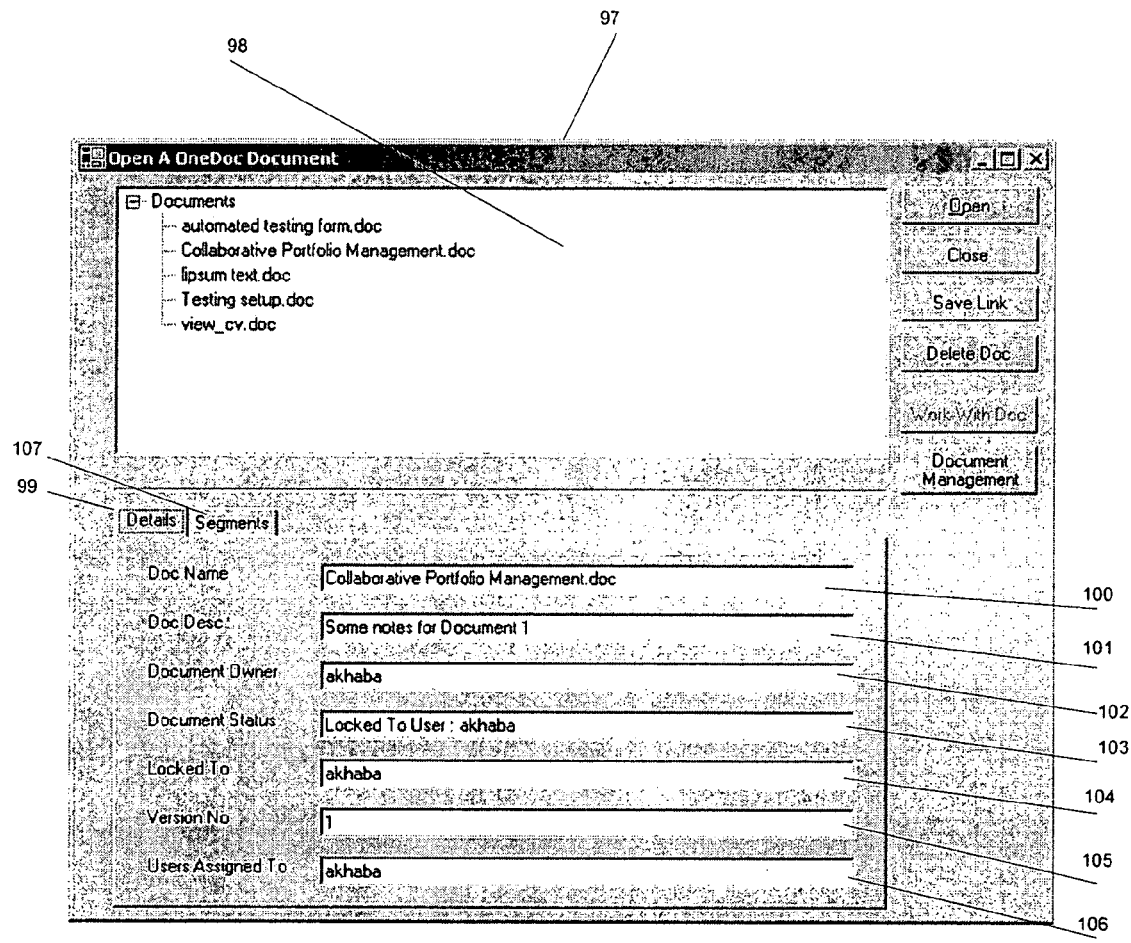
FIGS. 16 and 17 are screenshots of a dialog box used during the open document process of FIGS. 15A and 15B.
Figure 17:
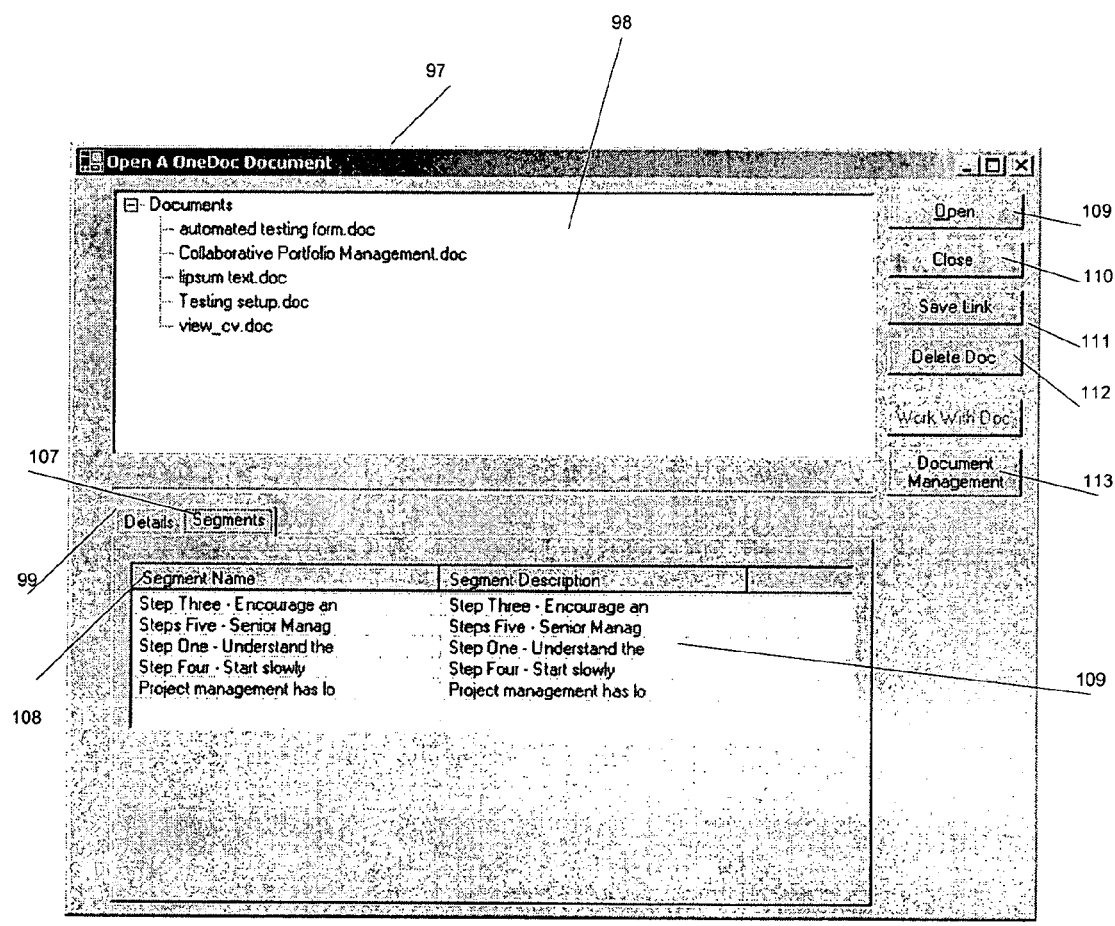

Having obtained details relating to available documents in the manner described above, the broker 19 displays a open document dialog box 97 to the user at step S52, which dialog box is illustrated in FIG. 16. A first area 98 of the open document dialog box 97 provides a list of documents which are stored in the database 6, each document being represented by a single entry in the MandorlaObject table 7. The user can select one of the documents identified in the first area 98, whereupon details relevant to that document are displayed on a details tab 99 within the open document dialog box. The details tab includes a document name field 100, a document description field 101, a document owner field 102, a document status field 103, a locked to field 104, a version number field 105 and a users assigned to field 106. Each of these fields is populated with relevant data from the MandorlaObjectVersion table 38. The dialog box 97 also includes a segments tab 107, which is illustrated in FIG. 17. The segments tab 107 takes the form of a table comprising a segment name column 108 and a segment description column 109. Each row of the table relates to a segment object represented in the MandorlaSharedObject table 41 which is related to the MasterObjectVersion record selected in the first area 98, the relationship being represented by an entry in the MandorlaLinkedObjects table 43.

The dialog box 97 additionally comprises an open button 109 which can be used to open a document selected in the first area 98, a close button 110 which can be used to close the dialog box 97, a save link button 111 which can be used to create a shortcut to a document. Pressing this button will present a further dialog box to the user into which a file path can be entered where a shortcut is to be created. A shortcut is then created at that file path, and when selected this shortcut will trigger the add-in 17*a* to fetch the appropriate data from the database to the application 17. Thus, the shortcut provides a convenient mechanism for users to access documents without needing to use the open OneDoc document dialog box.

A delete doc button 112 which can be used to delete a document from the database, and a document management button 113 which can be used to edit document details (described below).

Data input to the dialog box 97 by a user is obtained at step S53 (FIG. 15A). If the close button 110 was used by the user, this is detected at a decision block at step S54, and as no further action is required, control passes to step S55 where isClientBusy is set to FALSE, and then to step S56 where isServerBusy is set to FALSE. Processing then returns to step S47.

If the user chose a document, and used the open button 109, it is first necessary at step S57*a* to ensure that the user is authorised to access the master object (identified using the known ObjectID and ObjectVersionID) relating to the document (i.e. the user's UserID appears in the UserIDAssignedTo field of the appropriate record of the MandorlaObjectVersion table 38, and that the MandorlaUserAccess table 47 provides the necessary access rights). Similar checks are performed in connection with any segment objects (identified by means of SharedObjectIDs and SharedObjectVersionIDs). If the necessary rights are not provided, a message is displayed to the user at step S57*b*, and processing moves to step S55.

If the user has the necessary access rights, it is then necessary to ensure that no user has the master object locked for writing, to the exclusion of all other users. Execution therefore continues at step S57*c*. The broker checks the lock status of the appropriate record in the MandorlaObjectVersion table 38 to ensure that the appropriate record is not locked. If the master object is locked, again a message is displayed to the user at step S57*b*, and processing returns to step S55. It should be noted that because any segment objects associated with the master object are initially opened for read only access, assuming that the user has appropriate access permissions, the segment objects can be opened (but not edited) regardless of whether another user is currently editing those segment objects. No check is therefore required in this regard.

If the user has the necessary access permissions (step S57*a*) and the required master object is not locked (step S57*c*), it is then necessary to copy document data from the database 6 to the cache 23 so that the document can be displayed to the user. The ObjectID, ObjectVersionID, and all SharedObjectIDs and SharedObjectVersionIDs are known to the broker as described above. The ObjectID and ObjectVersionID can therefore be used to perform a lookup in the MandorlaObjectBlob table to obtain data representing the master object, and this data is copied to the cache 23 at step S58. Similarly, the or each SharedObjectID and SharedObjectVersionID can be used to obtain data for the or each segment object at step S59, and this data is copied to the cache 23 at step S60. Thus, the cache 23 contains all relevant master object and segment object data. Appropriate registry parameters are then set (step S61) to allow the add-in 17*a* to retrieve this data and assemble the document for display to the user. Specifically, an appropriate document folder is created within the LoadedDocs registry key R6, and data relating to the master object of the type described above is stored within the created folder. Additionally, a segment folder is created within the LoadedDocs registry key for each segment object, and each segment folder is again populated with appropriate data.

The isClientBusy registry field is set to FALSE at step S55 and the isServerBusy field is set to FALSE at S56. Processing within the broker 19 then returns to step S47. Given that the isServerBusy field is set to FALSE, processing within the add-in 17*a* can recommence (illustrated by an arrow 96 in FIG. 15A), and assembly of the document can take place as described below, with reference to FIG. 15B.

Figure 15B:
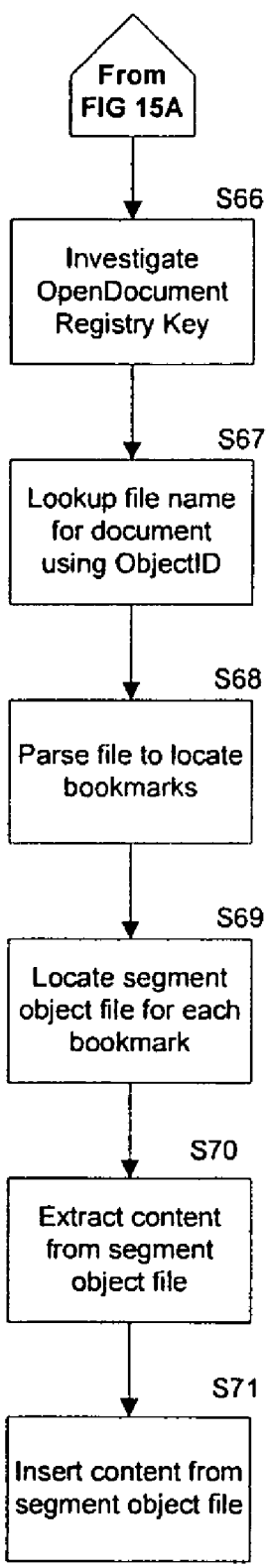

When step S45 (FIG. 15A) determines that isServerBusy is set to FALSE in the registry, execution passes to step S66 (FIG. 15B). The add-in 17*a* interrogates an OpenDocument registry key which is stored within the TransactionParams registry key R10 (FIG. 6). This interrogation will provide an ObjectID for the master object which represents the document. This ObjectID can be used to located the master object within the LoadedDocs registry key R7, at step S67 and when the object has been located, its local file name (within the cache 23) can be determined from registry data. The add-in 17*a* will therefore then be able to access the file representing the master object. It will be appreciated that additionally, a reverse lookup can be carried out using data stored in the registry. That is, given a particular file name an ObjectID can be retrieved and used to access the database. Such a reverse lookup is useful in that an application such as Microsoft Word can simply provide a file name, from which an ObjectID can be determined using the registry.

As described above, the master object may include a plurality of segment objects. The position of such segment objects is identified within the master object using Microsoft Word bookmarks. Having obtained the file representing the master object, the file is parsed (step S68) and any bookmarks are located. Bookmarks can conveniently be identified by SharedObjectIDs, and therefore. SharedObjectIDs obtained from bookmarks in this way can be used to locate each segment within the folder representing the document within the LoadedDocs registry key R5. Each registry key will specify a file name in which data relating to the appropriate segment object is stored, and the add-in 17*a* can therefore locate the necessary files (stored within the cache 23) storing segment object data (step S69). Having obtained the necessary files, content is extracted from the segment object files specified by the appropriate data from the cache (step S70). Content extracted in this way is then inserted into the master document at the appropriate bookmarks (step S71).

Having inserted the content from the segment object files into the master document, it is desirable to additionally add Word comments indicating where the various segment objects start and end. Such comments can be populated with a name for each segment and appropriate notes which can be taken from the MandorlaSharedObjects table, and which is copied to the appropriate registry key together with shared object blob data.

Referring back to FIG. 15A and FIG. 16, if the user used the delete button 112 in the dialog box 97, execution passes from step S54 to step S62, where the records relating to the master object in the MandorlaObject table 38, the MandorlaObjectVersion table 39 and the MandorlaObjectBlob table 40 are identified. All records located in this way are then deleted at step S63. The ObjectID is then used to perform a lookup in the MandorlaLinkedObjects table at step S64, and segment objects linked to the master object are identified. For each identified segment object, it is determined whether that segment object is linked to another master object is the MandorlaLinkedObjects table. At step S65 all records in the MandorlaLinkedObjects table which refer to the master object are deleted. Similarly, all records located in the MandorlaSharedObjects table which are linked to no other master object are deleted from the MandorlaSharedObjects table. Having completed the deletion operations, control passes to S55 and processing continues as described above.

Figure 18A:
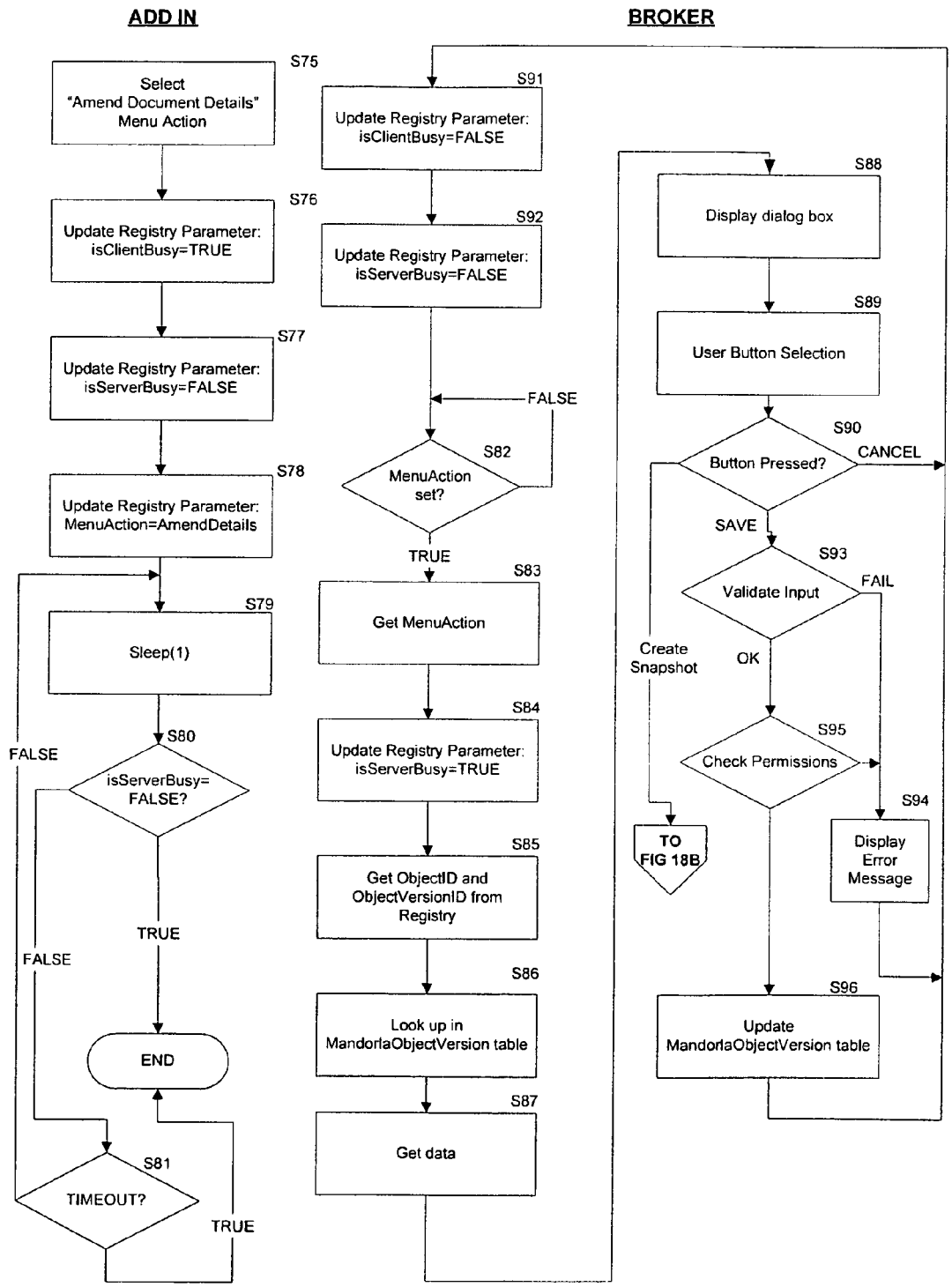
FIGS. 18A and 18B are flowcharts illustrating a process for amending document details in accordance with the present invention.
Figure 18B:
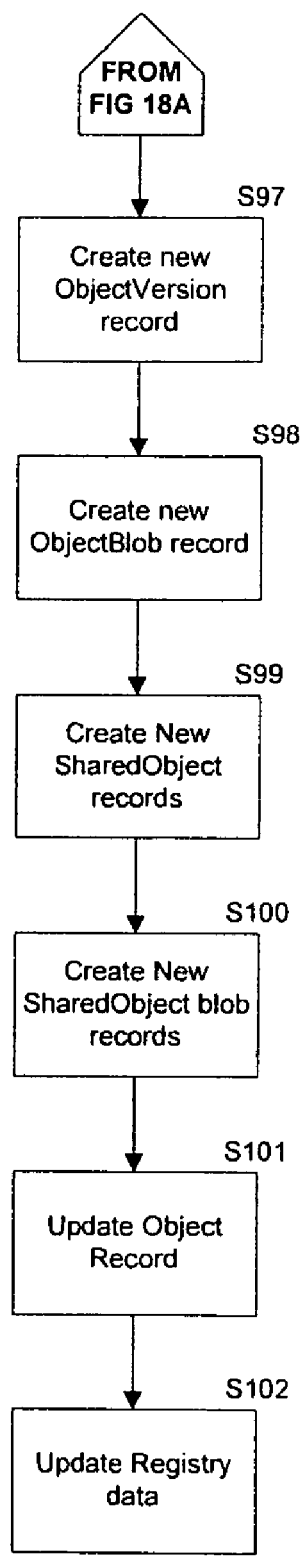

Referring back to FIG. 12, it can be seen that the OneDoc menu 75 provides an amend document details option, which allows details of the currently loaded document to be amended. Selection of this option results in processing by the add-in 17a and the broker 19 as illustrated in FIGS. 18A and 18B. Referring to FIG. 18A, at step S75 a user makes the appropriate menu selection. In the same way as described with reference to FIGS. 13 and 15A, the isClientBusy registry value is set to TRUE at step S76, isServerBusy is set to FALSE at step S77, and the MenuAction registry key R4 is set to indicate the selection made at step S78. Processing within the add-in 17a is then suspended by the action of a sleep command at step S79 and a loop at step S80 which continues until broker processing is complete. Again, a timeout is specified at step S81.

When the MenuAction parameter is set at step S78 this allows the loop denoted by step S82 to exit, and broker processing begins. Again, the broker 19 first obtains details of the menu option selected at step S83 and sets the isServerBusy registry value to TRUE at step S84. The Broker then obtains details of the ObjectID and ObjectVersionID relating to the master object from an appropriate folder within the TransactionParams registry key R10 at step S85. This data is used to perform a lookup in the MandorlaObjectVersion table 38 of the database 6 at step S86, and document details are then provided to the broker 19 at step S87. At step S88 the broker 19 displays to the user an amend document dialog box 120 which is illustrated in FIG. 19.

Figure 19:
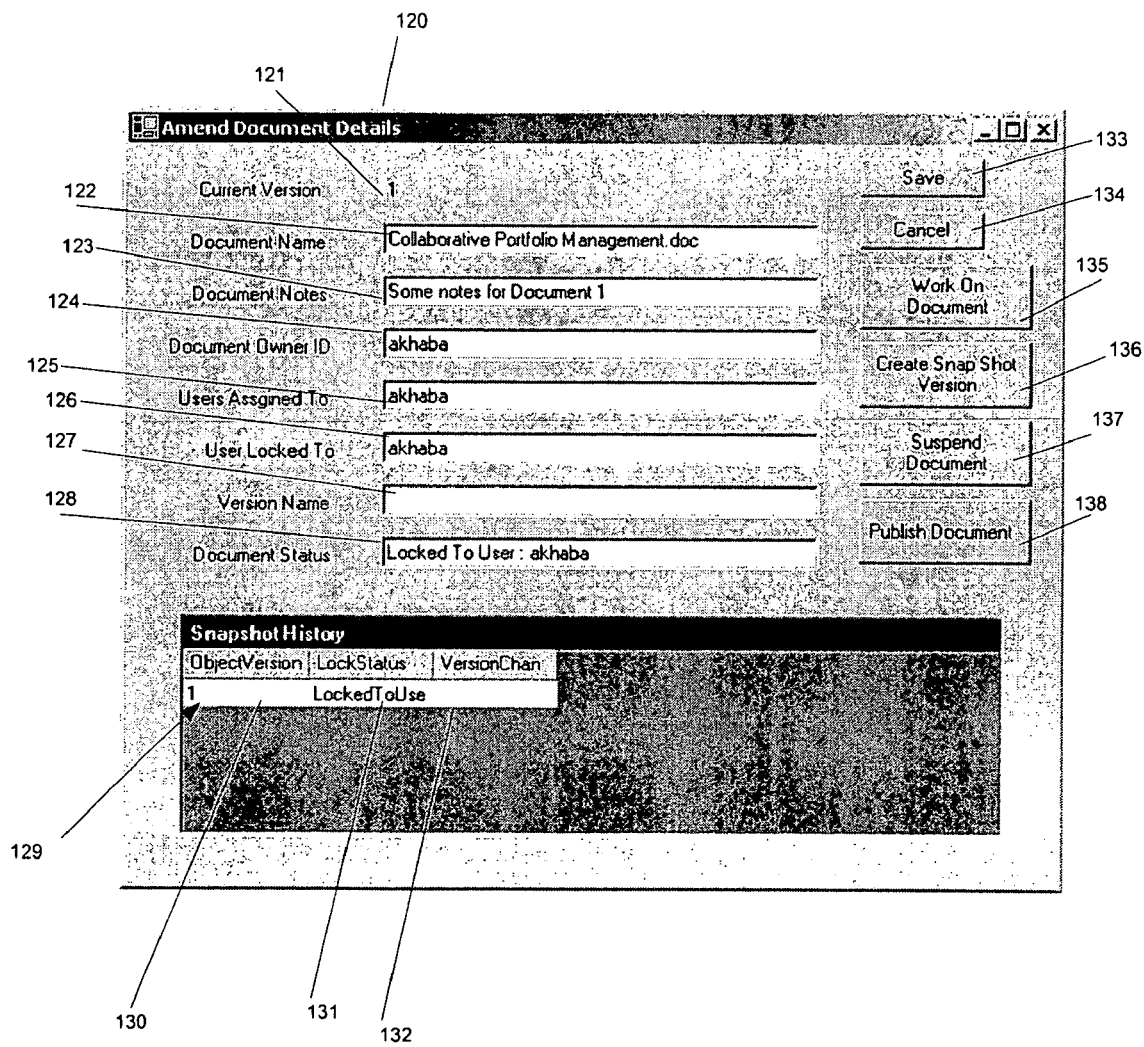
FIG. 19 is a screenshot of a dialog box used in the process for amending document details illustrated in FIGS. 18A and 18B.

Referring to FIG. 19, it can be seen that dialog box 120 comprises details 121 of the current document version which cannot be changed by a user. Additionally, the dialog box 120 comprises a plurality of editable text boxes which can be used to amend document details. A document name field 122 allows details of the document name to be edited, A document notes field 123 allows document notes to be edited, a document owner ID field 124 allows the document's owner ID to be edited, a users assigned to field 125 allows the users who can access a document to be changed, a user locked to field 126 allows the use to whom a document is locked to be changed, a version name field 127 allows a version to be named, or a previously allocated name to be changed, and a document status field 128 allows the status of a document to be changed.

The dialog box 120 additionally comprises a snapshot history area 129 which is used to show "snapshot" information. It may be desirable to store versions of a document at various times during the editing process so that it is possible to later review these versions to track changes between documents. Such stored versions are referred to as snapshots, and the creation of snapshots is described in further detail below. The snapshot history area 129 is a table comprising a version number column 130, a lock status column 131 and a version change notes column 132. Information required to populate this table is obtained from the MandorlaObjectVersion table 38.

Having amended document details a user can finish using the amend document details dialog box 120 using either a save button 133 or a cancel button 134. Referring back to FIG. 18A it can be seen that user button selection occurs at step S89, and the broker 19 determines which button was selected at step S90. If the cancel button 134 was used, no further action is required, and the isClientBusy variable is therefore set to FALSE at step S91, the isServerBusy variable is set to FALSE at step S92 and processing within the broker 19 passes to step S82. Setting isServerBusy to FALSE at step S92 allows the add-in 17a to exit the loop of step S80.

If the decision block of step S90 determines that the user selected the save button 133 at step S89, the details input by the user are validated by the broker at step S93. If validation fails execution passes to step S94 where an error message is displayed, and then to step S91 and then step S92 where isClientBusy and isServerBusy are appropriately set, before execution returns to step S82. However, if validation at step S93 is successful, then the user's permissions are checked at step S95 to ensure that the user's permissions are appropriate for the changes made, assuming that this is so at step S96 the broker 19 updates the appropriate record of the MandorlaObjectVersion table 38 with the data input by the user, isClientBusy and isServer busy are reset at steps S91 and S92 respectively, and execution passes to step S82. If the condition of step S95 is not satisfied, execution passes to step S94 where an error message is displayed, and then on to step S91 as described above.

Referring back to the amend document details dialog box 120 of FIG. 19, it can be seen that further buttons are also included within the dialog box. A work on document button 135 allows a user to edit the document for which details are displayed. A create snapshot version button 136 creates a snapshot version of a document, as mentioned above. If step S90 detects that the create snapshot version button 136 has been selected, execution passes to step S97 (FIG. 18B) where a new record is created in the MandorlaObjectVersion table 38. This involves generating a new ObjectVersionID, and creating a record having a common ObjectID but new ObjectVersionID. The ObjectID and ObjectVersionID within the registry are used to look up relevant data in the MandorlaObjectVersion table, and this data is copied across to the new record where appropriate, however the ObjectVersionNo field of the previous record will be incremented to provide an appropriate value for the corresponding field of the new record, and DateTimeStamp will be set appropriately.

At step S98 a new record is created in the MandorlaObjectBlob table 39. This new record has the same ObjectID and ObjectVersion ID as the new record in the MandorlaObjectVersion table 38, and the ObjectImage field (which contains the blob data) is copied from the record in the MandorlaObjectBlob table 39 for the currently open document.

At step S99, new records for each segment object are created in the MandorlaSharedObject table 41, in a process similar to that for creation of the new MandorlaObjectVersion record. Similarly, at step S100 new records in the MandolaSharedObjectBlob table 42 are created. Having created the new records described above, the ObjectVersionID field in the record of the MandorlaObject table 37 having the specified ObjectID is updated to show the newly created ObjectVersionID at step S101.

Having made all necessary amendments to the database 6 to reflect creation of the snapshot, the registry data is updated to show that the currently open document is now that which is stored as the newly created records. This is achieved by removing a folder from the LoadedDocs registry key R6, and adding a new folder which has the same ObjectID but the new ObjectVersionID, and also has segment folders bearing the new SharedObjectVersionIDs. Thus, it is the new version of the document that is then worked upon. The amend document details dialog box 120 will reflect creation of the new snapshot version in the snapshot history area 198.

Referring back to FIG. 19, it can be seen that the dialog box 120 additionally comprises a suspend document button 137, and a publish document button 138. The suspend document button 137 sets the ObjectStatus field of the appropriate record in the MandoralaObjectVersion table 38 to SUSPEND, and sets the SharedObjectStatus field of the appropriate record(s) in the MandorlaSharedObject table 41 to SUSPEND. When the status of segment or master objects is set in this way no further changes can be made to the document.

The publish document button 139 creates a new version of the document (in a similar manner to that described for the create snap shot version button 136), and the published version has the status of its master and segment objects set to PUBLISH, preventing any further amendements being made.

Referring back to FIG. 12, further options presented by the OneDoc menu 75 are now described. It can be seen that the menu includes a create document snapshot option, and this performs an identical function to the create document snapshot button 136 in the amend document details dialog box 120 (FIG. 19). A save and refresh segments option saves all current segment updates in the appropriate database tables, and reads segment object data from the database so as to obtain any updates which may have been made by other users. A save and close document option saves amendments made to the master object and any segment objects to which the user has write access, and closes the documents. Saving such changes involves saving data to propriate locations within the cache, at which time the broker 19 can initiate processing to copy the changes from the cache to the appropriate database tables.

Figure 20:
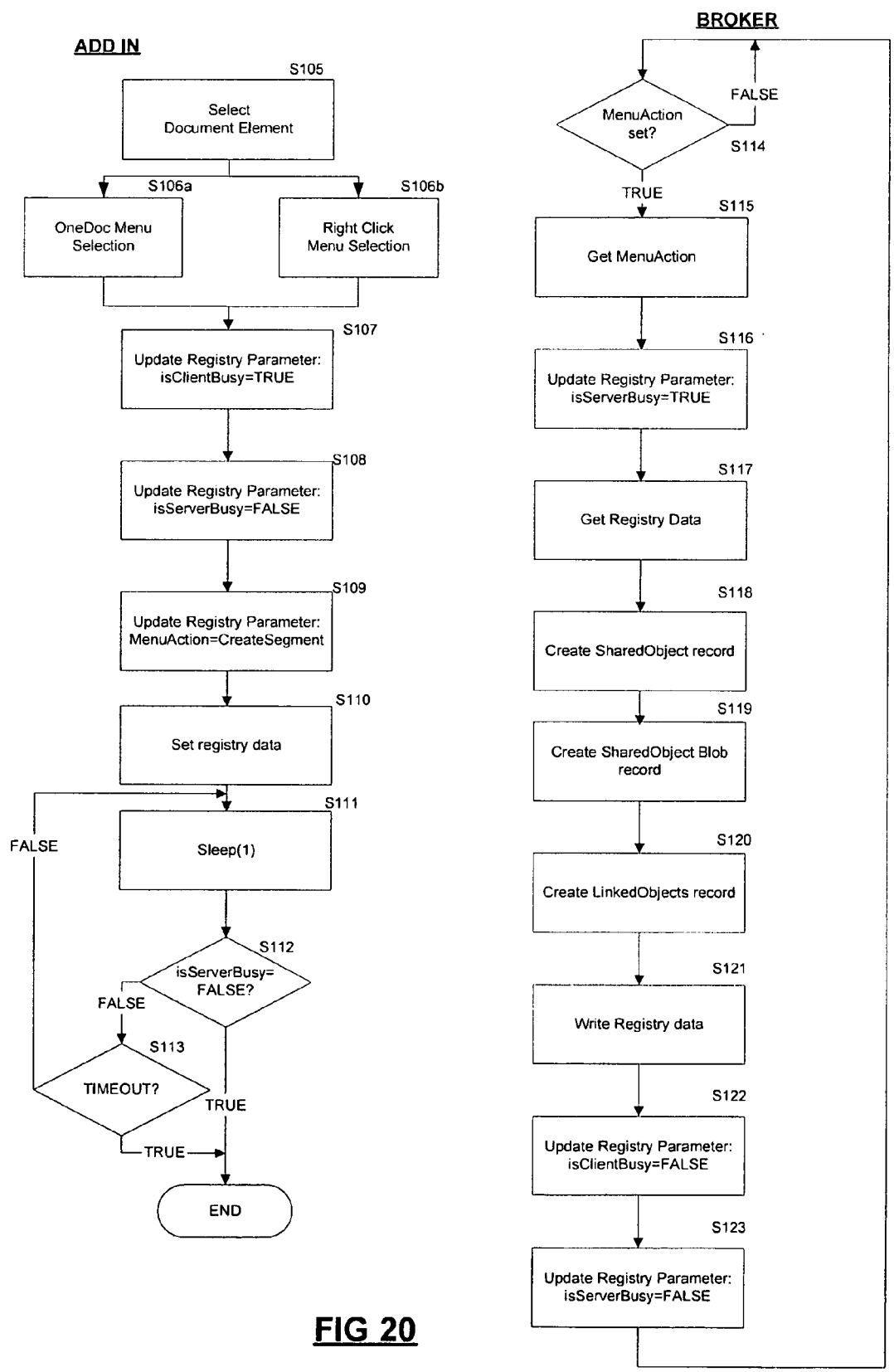
FIG. 20 is a flow chart showing a process for creating new segments in accordance with an embodiment of the present invention.

Document creation has been described above. However, such document creation creates a single master object, and no segment objects. Creation of a segment object is now described with reference to FIG. 20. At step S105 a user selects a document element which is to form the basis of the new segment. This may be a portion of text such as a paragraph or plurality of paragraphs, or alternatively an image. Having made such a selection a user can either select a create one doc segment option on the OneDoc menu 75 (FIG. 12) at step S106a or alternatiely can click a menu button configured to display a menu (typically a right hand mouse button on a two-button mouse operating under a Microsoft Windows operating system), and make a selection from such a menu at step S106b. Execution then passes to step S107 where isClientBusy is set to TRUE within the SessionParams registry key R6, and at step S108 isServerBusy is set to FALSE. The MenuAction registry key R4 is appropriately set at step S109. At step S110, the add-in 17a loads data into a CreateSegment folder within the TransactionParams registry key R10. This data include an ObjectID and ObjectVersionID for the currently active master object, and a name for the newly created segment, which can suitably be created using a first predetermined number of characters within the selected text for text segments. Additionally, the add-in 17a creates a Microsoft Word subdocument containing the selected text, deletes the selected text from the document representing the master object document, inserts a bookmark within the master object document indicating where the subdocument should be inserted, and proceeds to insert the subdocument at the bookmark. It should be noted that in order to create the sub document, the first line of the segment must be set to a style of Heading1, given restrictions imposed upon Microsoft Word sub documents. The file containing the segment at a location within the cache which is provided within the CreateSegment folder within the TransactionParams registry key.

Having appropriately set the registry data described above, the add-in 17a executes a sleep command at step S111, and then waits until broker 19 processing is complete through the action of a decision block at step S112 which allows execution to continue only when isServerBusy is set back to FALSE. Step S113 provides a time out as described above.

The broker 19 is initially within a loop at step S114 waiting until MenuAction is set to a non-NULL value. When MenuAction is set at step S109, broker processing can begin. At step S115 the broker 19 interrogates the MenuAction registry key R4 to determine the menu action, and isServerBusy is then set to TRUE at step S116. At step 117, the broker 19 interrogates the CreateSegment folder to obtain the data placed in that folder by the addin 17a. Having obtained this data, the broker 19 creates new record in the MandorlaSharedObject table 41 at step S118. At step S119 an appropriate record in created in the MandorlaSharedObjectBlob table 42, and data is streamed from the file within the cache 23 containing data from the segment to the SharedObjectImage field of that record.

At step 120 a new record is created in the MandorlaLinkedObjects table 43 relating the ObjectID and VersionID of the master object specified within the registry with the newly created MandorSharedObject entry created by the broker 19. An identifier for the bookmark inserted by the addin 17a into the document is stored to identify the position of the segment in the document. Other fields of the newly created record are appropriately populated.

At step 121 the broker 19 sets fields within the CreateSegment folder in the registry identifying the created segment object (e.g. SharedObjectID and SharedObjectVersion) such that this data is accessible to the add-in 17a. Additionally, a segment folder is added within the appropriate document folder in the LoadedDocs registry key R6 as described above. Having appropriately updated the registry data described above, isClientBusy (in the SessionParams registry key R5) is set to FALSE at step S122, and isServerBusy is set to FALSE at step S123. After isServerBusy is set to FALSE, the loop of step 112 within the add-in 17a can exit, the add-in can then open the appropriate newly created segment object using registry data, and both the add-in 17a and the broker 19a have therefore completed processing for the create segment operation.

Figure 21:
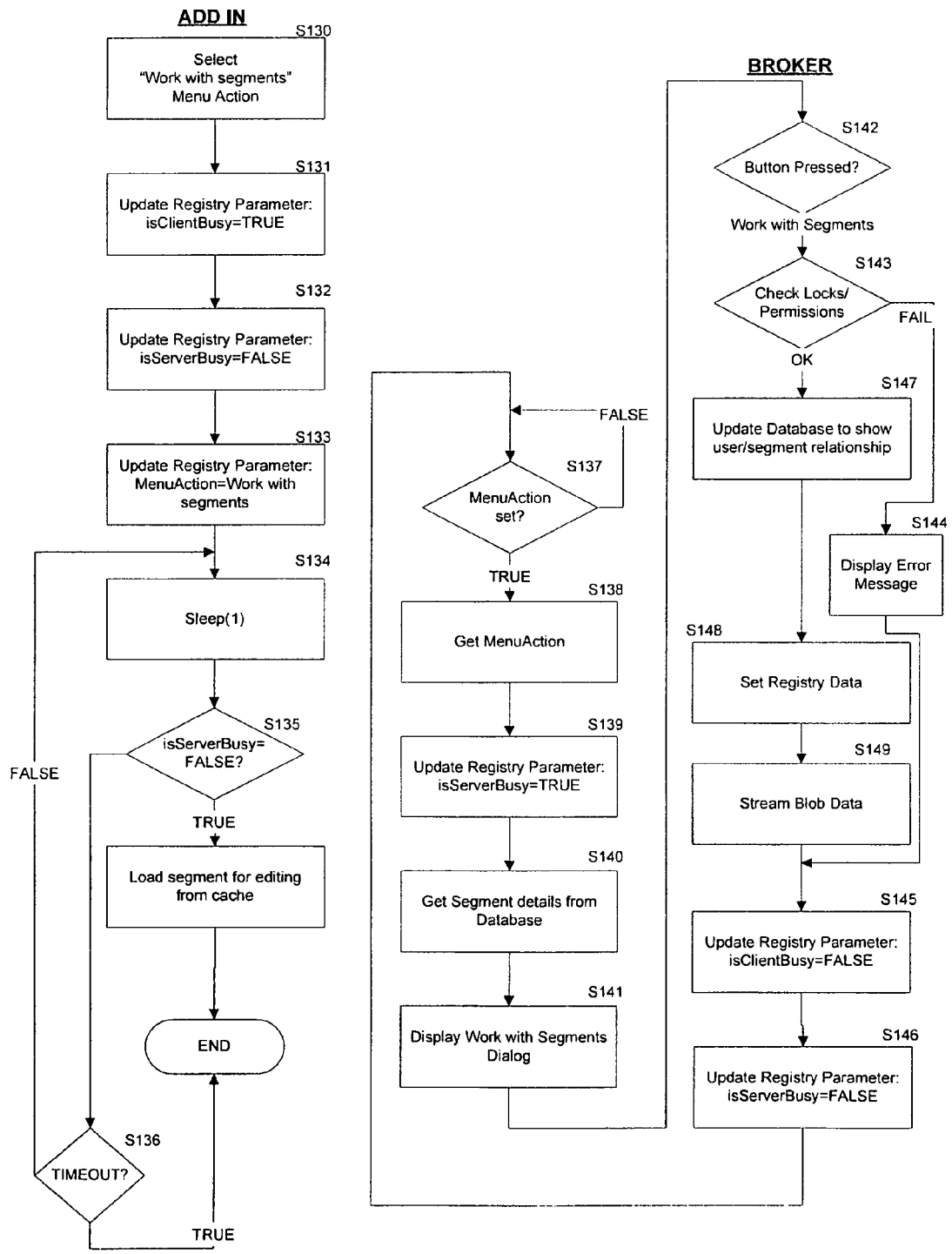
FIG. 21 is a flowchart of segment processing in accordance with an embodiment of the present invention.

The OneDoc menu 75 (FIG. 12) also includes a work with segments option which is now described with reference to FIG. 21. At step S130 the work with segments menu option is selected. isClientBusy is set to TRUE at step S131, isServerBusy is set to false at step S132, and MenuAction is set appropriate at step S133. The add-in 17a then executes a sleep command at step S134 and enters a loop which terminates only when broker processing is complete (step S135), subject to a timeout (step S136) as described above.

The broker 19 waits within a loop at step S137 until MenuAction is set (which happens at step S133). The broker then obtains details of the menu action performed at step S138 and sets isServer busy to TRUE at step S139. The broker 19 then gets details of all segment objects stored in the database 6 at step S140. The broker 19 interrogates the MandorlaSharedObject table 41 and obtains one record for each SharedObjectID, that record being the record having the highest SharedVersionNo, (i.e. the latest version). Having obtained details for each segment, a work with segments dialog box 140 illustrated in FIG. 22 is displayed at step S141.

Figure 22:
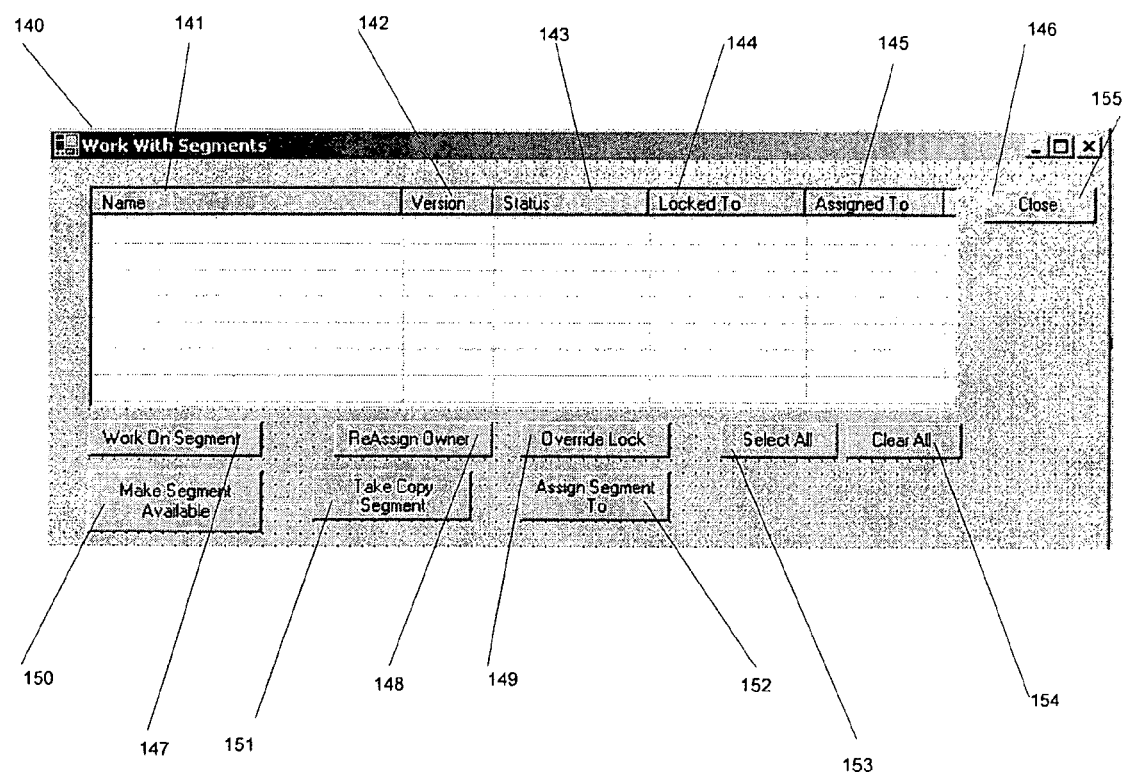
FIG. 22 is a screenshot of a dialog box used in the segment processing of FIG. 21.

Referring to FIG. 22, it can be seen that the work with segments dialog box 140 comprises a table 141 which comprises a segment name column 142, a segment version number column 143, a status column 144, a locked to column 145 and an assigned to column 146. The table 141 comprises one row for each segment object which is populated with data obtained from the MandorlaSharedObject table 41, as described above.

If a user wishes to open and edit a segment, its row within the table 141 is selected, and a work on segment button 147 is selected. If step S142 of FIG. 21 determines that the work on segment button 147 has been pressed, details of the selected segment are obtained, and checks are performed to ensure that the user has the necessary access permissions to access the selected segment, and also that the segment is not locked (step S143). If the user does not have the necessary permissions, an error message is displayed at step S144, isClientBusy is set to FALSE at step S145, isServerBusy is set to FALSE at step S146, and processing returns to step S137. If the permissions check of step S143 is successful, the appropriate record in the MandorlaSharedObject table 41 is updated to show that the segment is locked to the user making the selection at step S147, and the appropriate segment data is copied from the MandorlaSharedObject table 41 to the registry at step S148. Segment data is then streamed from the SharedObjectBlob table 41 to the cache 23. Processing within the broker then returns to step S137 (via steps S145 and S146), and given that isServerBusy has been set to FALSE, the add-in loop of step S135 exits, and appropriate segment data is loaded at step S149A.

Referring back to FIG. 22, use of other buttons within the work with segments dialog box 140 is now described. A Reassign owner button 148 presents a dialog which allows a user to amend the owner of a segment selected within the table 141. Assuming that the user has the necessary permissions to make the change, the broker 19 makes an appropriate amendment to the SharedObjectOwnerID field of the record of the MandorlaSharedObject table 41. An override lock button 149 allows an owner of a selected segment to override a lock which may have been placed upon the selected segment by another user. A make segment available button 150 allows an owner of a selected segment to make that segment available to one or more other users specified within a dialog box displayed in response to selection of the make segment available button.

Figure 23:
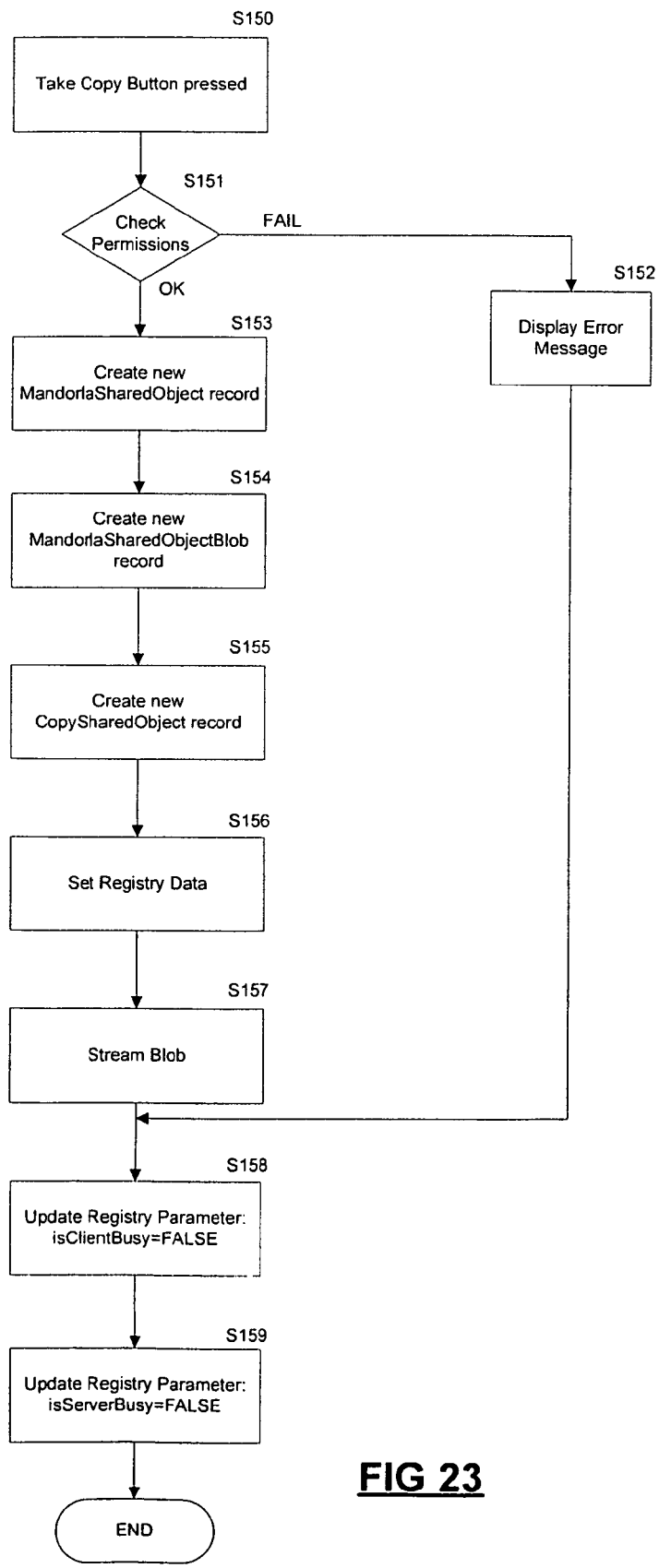
FIG. 23 is a flowchart of a process for creating a copy of a segment object using a button provided by the dialog box of FIG. 22.

A take copy segment button 151 creates a copy of a selected segment object. The process of creating such a copy segment is now described with reference to FIG. 23. At step S150 the take copy segment button 151 is pressed, and at step S151 a check is made to ensure that the user has the necessary permissions to make such a copy. If the user does not have the necessary permissions an error is displayed at step S152, isClientBusy is set to FALSE at step S158, isServerBusy is set to FALSE at step S159, and processing ends. If the user does have the necessary permissions, the broker 19 creates a new record in the MandorlaSharedObjects table 41 at step SI 53. This new record will have the same SharedObject ID as the segment selected in the table 141, but the SharedObjectVersionID will differ, and will be automatically generated by the database 6. The SharedObjectOwnerID field of the newly created record is set to the UserID of the user selecting the button 151. Other fields of the new record are appropriately set. At step S154 a new record is created in the MandorlaSharedObjectBlob table 42, which has the same SharedObjectID and SharedObjectVersionID as the new record in the MandorlaSharedObject table 41, and the same SharedObjectImage field data as the record of the MandorlaSharedObjectBlob table representing the original segment object. At step S155 a new record is created in the MandorlaCopySharedObjects table 44. This record has SharedObjectIDs and SharedObjectVersionIDs for both the original and copied shared object records, and additionally comprises details identifying the owner of each of the two shared objects. Having created the necessary records, the broker 19 sets up appropriate registry data at step S156 so that the add-in 17a can access the copy segment object for presentation to the user. At step S157 the copy segment object is streamed to the cache 23, at a location specified within the registry. The isClientBusy field is set to FALSE at step S158, and isServerBusy is set to FALSE at step 159. Processing within the broker then returns to step S137 (FIG. 21). The add-in 17a can then process the copy segment in the same way as a master segment, as described with reference to FIG. 21.

Referring again to FIG. 22, the dialog box 140 further comprises an assign segment to button 152 which adds a specified user to the UserIDAssignedTo field of the appropriate record of the MandorlaSharedObject table 41 by adding an appropriate UserID. The dialog box 140 also comprises a select all button 153 which selects all rows in the table 141, and a clear all button 154 which clears any selection which may have been made in the table 141. A close button 155 is provided to close the dialog box 140.

Referring back to FIG. 12 it can be seen that the OneDoc menu 75 also includes an include segment option. Selection of this option displays details of all segment objects stored within the database, and adds one such segment object to the currently open document at the current cursor position. A bookmark is created within the document to indicate where the segment object is to be positioned, and a sub document containing the segment data is created and associated with the created bookmark. This operation will create a new record in the MandorlaLinkedObjects table 43, It should be noted that if a document uses two occurrences of a particular segment object, two copies of the segment data will appear within the cache 23, as working in this way has been found to provide increased reliability.

Figure 24:
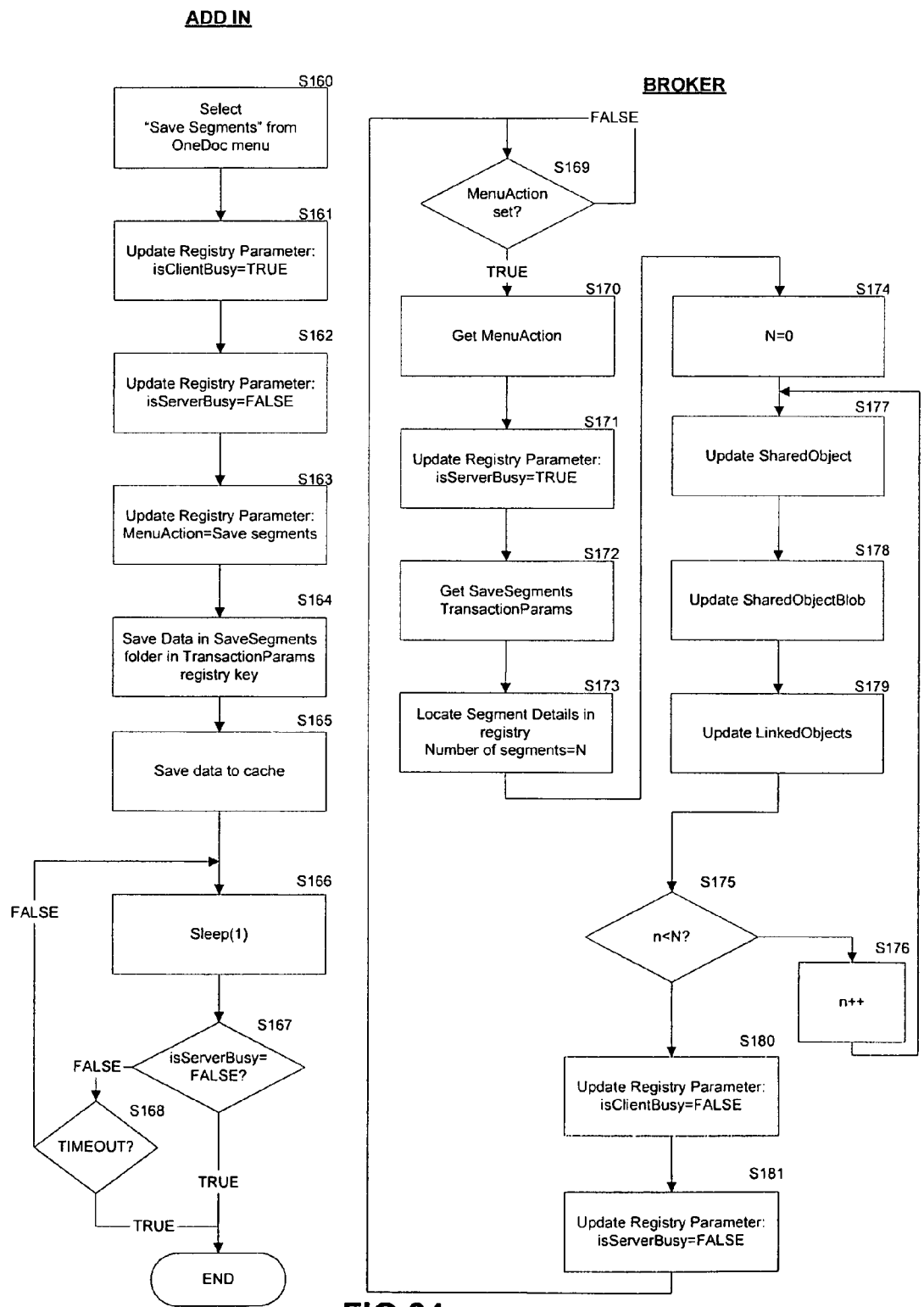
FIG. 24 is a flowchart of a process for saving segment data in accordance with an embodiment of the present invention.

A save segments option on the OneDoc menu 75 saves any updates which have been made to any open segments, and processing performed in response to selection of this option is now described with reference to FIG. 24. At step S160 the user selects the save segments menu option. The add-in 17a then appropriately sets isClientBusy, and isServerBusy at steps S161 and

S162. MenuAction is appropriately set at step S163. The add-in 17a then sets ObjectID and ObjectVersion ID parameters for the current master object within a SaveSegments folder of the TransactionParams registry key R10 at step S164. At step S165, the add-in 17a ensures the up to date data for each segment object is stored within the cache, at the filename specified within the appropriate segment folder within the LoadedDocs registry key R6. The add-in then enters a loop (steps S166 to S168) as described above, until broker processing is complete.

Setting the MenuAction parameter at step S163 allows the loop of step S169 within the broker 19 to exit. The Broker then obtains details of the selected menu item at step S170 and sets isServerBusy to TRUE at step S171. Having identified the menu action, the broker 19 interrogates the SaveSegments folder of the TransactionParams registry key R10 at step S172 to obtain the ObjectID and ObjectVersionID of the currently open master object. At Step S173 the obtained ObjectID and ObjectVersionID are used to locate the appropriate document folder within the LoadedDocs registry key R6, which contains a segment folder for each segment object. The broker 19 can therefore identify the segments to be saved, and also how many segments are to be saved. A loop is then established processing each segment in turn (steps S174, S175, S176). For each segment object, the broker 19 updates an appropriate record of the MandorlaSharedObject table 41 at step S177 by updating the LastUpdate field. At step S178 the broker updates the appropriate record of the MandorlaSharedObjectBlob table 42, by streaming data from the specified file within the cache to the SharedObjectImage field of the MandorlaSharedObjectBlob record. At step S179, the appropriate record of the MandorlaLinkedObjects table 43 is updated to reflect the latest update time. Having carried out this processing for each segment object, the loop exits at step S175, isServerBusy is set to FALSE at step S180 and isClientBusy is set to FALSE at step S181. Processing within the broker 19 therefore returns to step S169 to await further add-in activity. The loop within the add-in (step S167) terminates in response to isServerBusy being set to FALSE.

Selecting a refresh segments option provided by the OneDoc menu 75 results in the broker 19 fetching data for each segment object within the document (identified using the LoadedDocs registry key R6 described above) from the database 6 into the cache 23. When this data has been fetched, the addin can then update all sub documents with the updated segment data.

An export document option results in the creation of a single file representing the document, that is a single file containing the current master object and all current versions of segment options. Such a file is created by the add-in, and saved to a user specified location on an appropriate storage medium. The file can be saved in any suitable supported file format such as, for example, a Microsoft Word document, or a Portable Document Format (PDF) format document.

The OneDoc menu 75 provides OneDoc options and user manager options which result in the display of suitable dialog boxes (such as those of FIGS. 9 to 11) to allow management functions to be carried out.

A copy document option results in a complete copy of an entire document (i.e. master object and all segment objects) being created and stored in the database 6. A copy document from snapshot option similarly results in a complete copy being created, but the copy is based upon a document snapshot which is selected from a suitable dialog box.

It has been described above that embodiments of the invention may support versioning, such that different versions of a single document exist. Implementation of versioning is now described.

Figure 25:
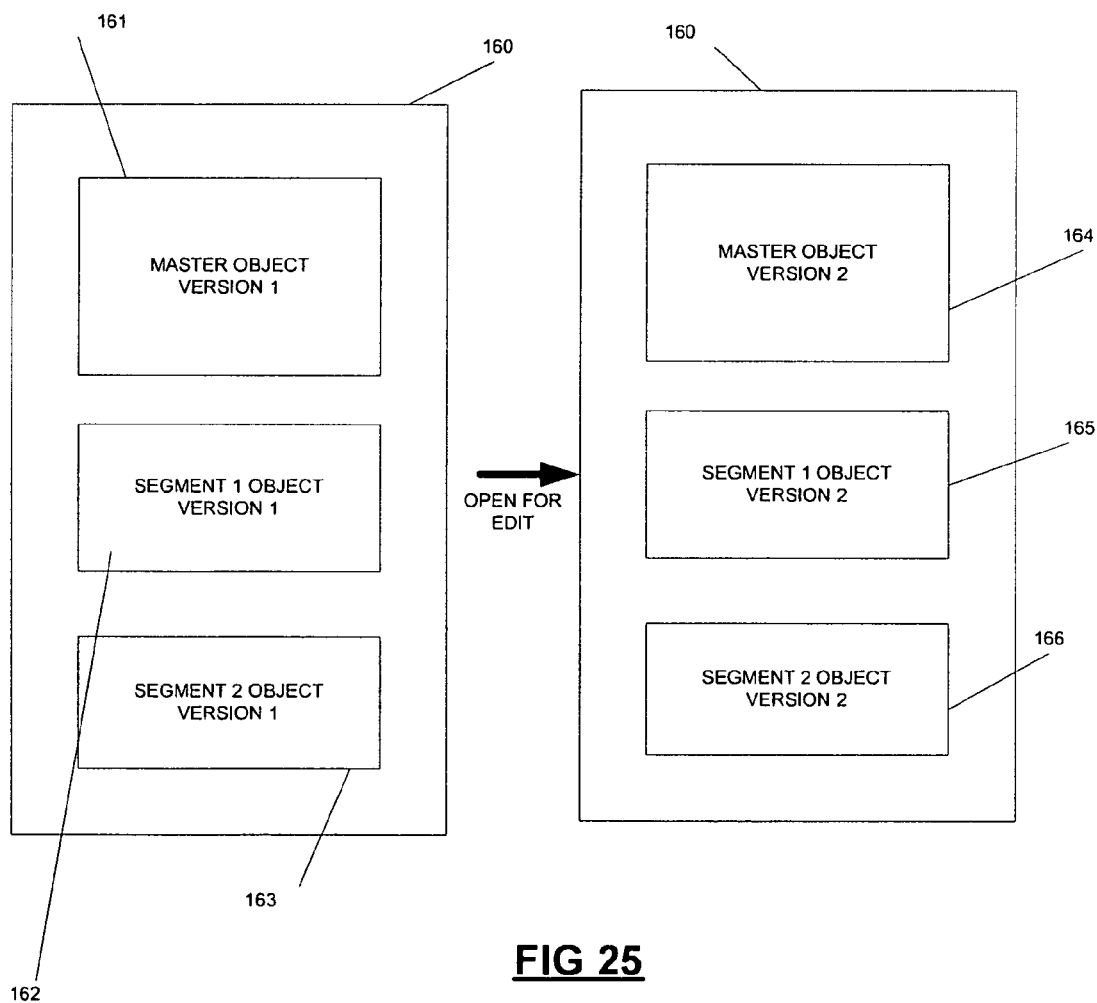
FIG. 25 is a schematic illustration of versioning used in embodiments of the present invention.

First, it should be noted that creation of a new version can effectively be forced by creating a snapshot version as described above. However, the system also automatically creates a new version of a segment or master object as is now described with reference to FIG. 25. FIG. 25 illustrates a document 160 which is represented by a first version of a master object 161, a first version of a first segment object 162 and a first version of second segment object 163. When a user opens the master object and each segment object for editing, it is preferred that a new version of each object is created by creating appropriate records within the appropriate database tables. That is, the document 160 is represented by a second version of the master object 164, a second version of the first segment object 165 and a second version of the second segment object 166. By creating new versions in this manner, changes made by the user editing the document can easily be tracked, and undone if necessary.

Additionally, a plurality of copies of a master object or segment object may exist for the use different users, and means are provided to compare and merge changes made.

It has been described above that segment objects are preferably combined with their associated master object as subdocuments, which conveniently provide a suitable locking mechanism to lock segments which cannot be edited. However, in alternative embodiments of the presnt invention, segment objects are combined with master objects using different mechanisms. For example, segment objects can simply be pasted into the document, with locking being managed by other means (such a dynamic macro creation, described below).

Furthermore, in some embodiments of the invention, instead of using bookmarks to indicate where within the master object segment objects should be positioned, a first pointer can be provided which indicates a number of characters from the start of the file where a segment object begins, and a second pointer can be provided to indicate a number of characters from the start of the file where a segment object ends.

It has been described above that a whole document comprising a master object and one or more segment objects may be displayed to a user for editing, although some parts of the document may be locked for editing by other users. In such circumstances, it is possible to communicate a user's updates to all other users viewing the file substantially in real-time. However, working in this way can be disconcerting. Therefore, in preferred embodiments of the invention, locked segments are updated at predetermined intervals, set within the dialog box 50 (see FIG. 10). Furthermore, the dialog box 50 can be used to specify whether or not alerts should be generated to inform users of other users' changes.

Figure 26:
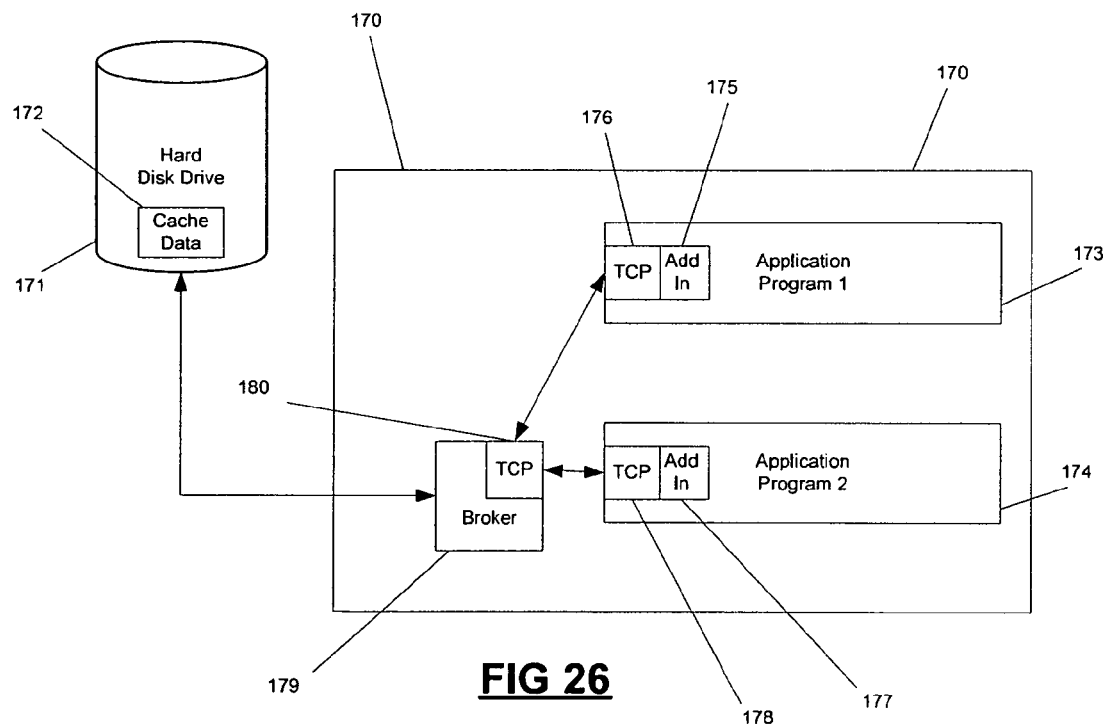
FIG. 26 is a schematic illustration of an alternative architecture for the workstation of FIG. 2.

In the embodiments of the present invention described above, communication between the add-in and the broker is achieved via the registry. FIG. 26 illustrates an alternative means of communication between the add-in and the broker. Referring to FIG. 26, it can be seen that a workstation 170 is connected to a hard disk drive 171 which stores cache data in a cache 172. The workstation 170 runs a first application program 173 and a second application program 174. It can be seen that the first application program includes an add-in 175, and additionally includes a transmission control protocol (TCP) interface 176. Similarly, the second application program 174 includes an add-in 177 and a TCP interface 178. A broker program 179 is also run on the workstation 170, and manages communication with a remote database (not shown). The broker 179 again includes a TCP interface 180.

In the embodiment illustrated in FIG. 26, communication between the add-ins 175, 177 and the broker 179 is accomplished by communication using the TCP protocol between the TCP interfaces 176, 178 and the TCP interface 180. There is therefore no longer a need to use the registry as described above, and communications is instead implemented using a widely used communications protocol.

Figure 27:
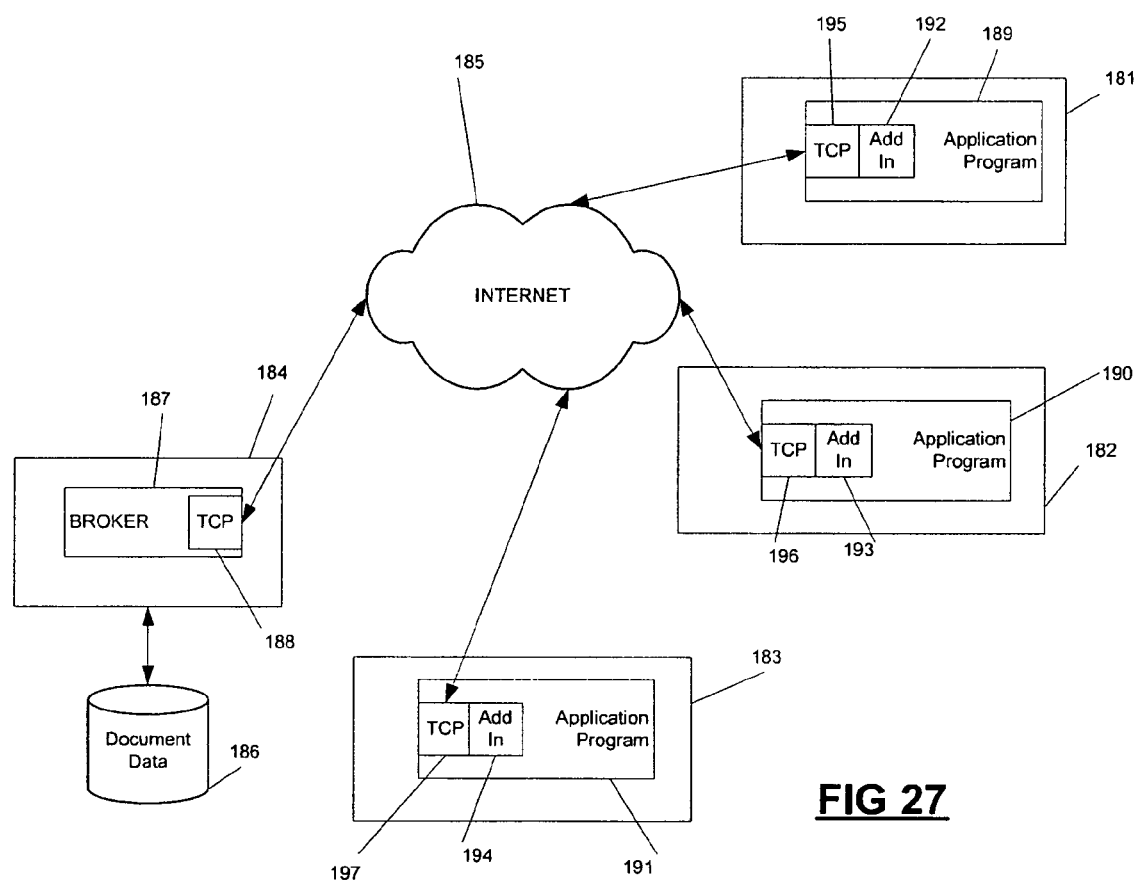
FIG. 27 is a schematic illustration of an alternative computer network to that of FIG. 1 which can be used to implement the present invention.

In the embodiments of the invention described above, each workstation operates its own broker application which manages communication with the remote database. However, in alternative embodiments of the present invention, a central broker is used. Referring to FIG. 27, it can be seen that three workstations 181, 182, 183 communicate with a server 184 via the Internet 185. The server 184 has a database 186 of the form described above. Additionally, the server 184 runs a broker application 187 which has a TCP interface 188. Each workstation runs an application program 189, 190, 191, which includes an add-in 192, 193, 194, and each add-in includes a TCP interface 195, 196, 197. Thus each add-in 192, 193, 194 can communicate with the broker application 187 operating on the remote server using the TCP protocol. The broker application 187 will perform similar functions to those of the broker 19 (FIG. 3), although it will maintain a session for each application program 189, 190, 191.

Figure 28:
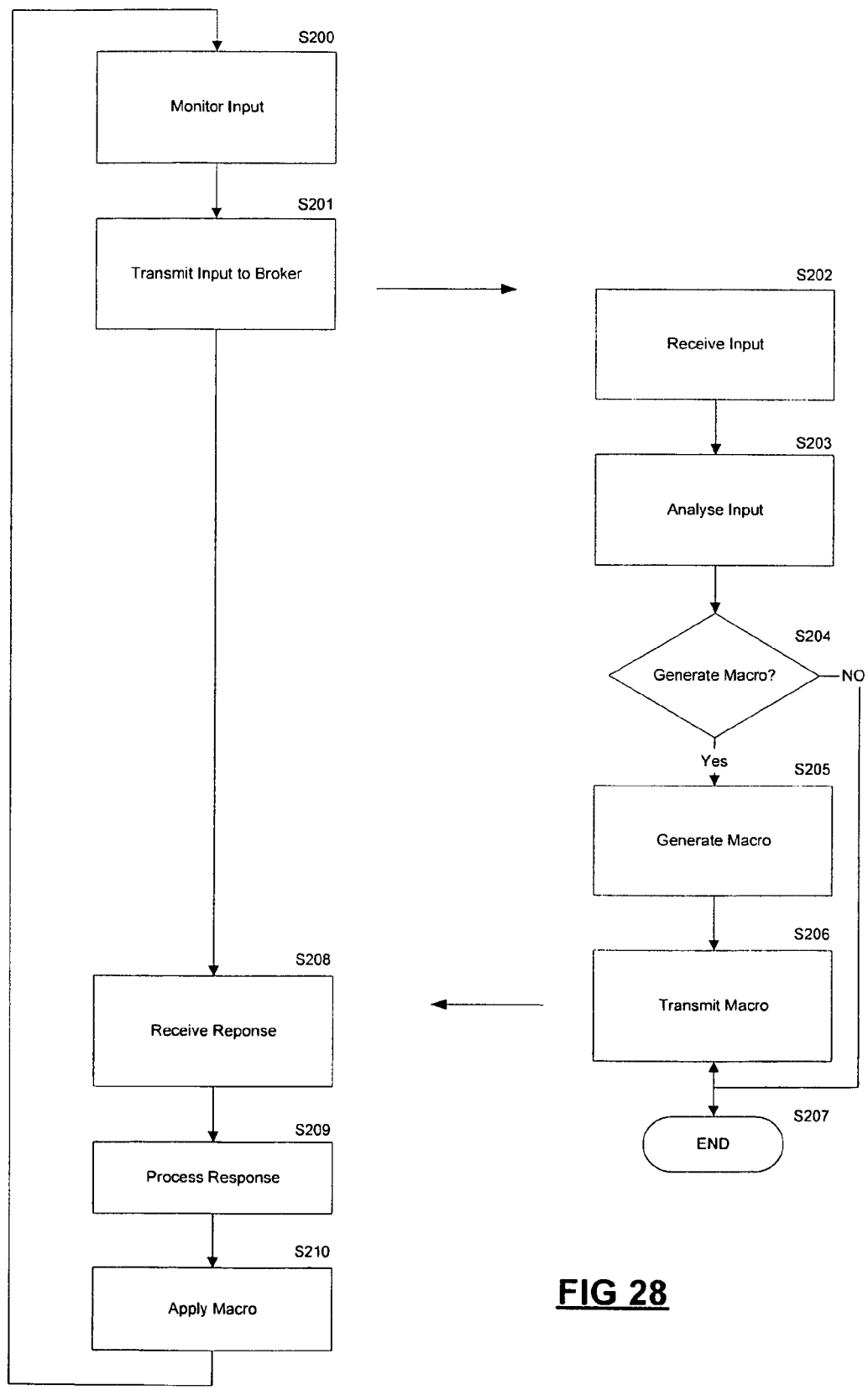
FIG. 28 is a flow chart showing how macros can be dynamically created and applied to affect document creation.

The architecture of FIG. 27 may be employed to remotely monitor and affect document creation using the application programs 189, 190, 191. In particular, if the application programs each provide a macro language in which macros can be created and applied to affect document creation, macros can be dynamically created in response to user input and subsequently be applied to the document being created. This can be achieved using processing as illustrated in the flowchart of FIG. 28. At step S200 input to one of the applications is monitored by its respective add-in, and this input is transmitted to the broker 187 at step S201. At step S202 the broker 187 receives the input which is analysed at step S203. At S204 the received input is compared with predefined rules to determine whether or not document creation should be affected. If it is determined that document creation should be affected, a macro is generated at step S205 and this is transmitted back to the add-in at step S206, and processing within the broker terminates at step S207. At step S208 the add-in receives a response from the broker 187, and the response is processed at step S209. The macro received within the response is then applied to the document being created. Processing then returns to step S200.

The processing of FIG. 28 can be used to affect document creation in a variety of ways, including imposing locking of segments where sub documents are not used, and also in applying uniform style constraints to all documents created by applications connected to the broker 187.

In some embodiments of the invention, users may connect to a computer network to obtain document data from a remote server in the manner described above, and then disconnect from the network. A user working in this way can continue to edit downloaded data, and when editing is complete, the user can reconnect to the computer network to allow updated segment data to be returned to the server, and also to allow the server to inform the user's computer of any changes to read only segments which are being used.

Although preferred embodiments of the present invention have been described above, it will be readily apparent to those skilled in the art that various modifications can readily be made without departing from the spirit and scope of the present invention.

For example, although preferred embodiments of the present invention have been described with reference to word processor and spreadsheet applications, it will be apparent that the invention is not limited to such software, but is instead widely applicable to a range of different document creation software including presentation packages and drawing packages. Furthermore, although some parts of the invention have been described with reference to Microsoft Windows based operating systems, it will be appreciated that the invention is in no way limited to such operating systems but can instead by implemented under any appropriate platform including UNIX platforms such as LINUX, SUN OS or Solaris Furthermore, in some embodiments of the invention, a plurality of segment objects may be stored in a variety of different file formats, and means may be provided to enable real-time file conversion between these different file formats to enable creation of a single document for editing.

References have been made above to representing segment objects using sub document files within the Microsoft Word application. It will be appreciated that the invention is not limited to using Microsoft Word sub documents but is instead able to use any suitable file format. Such suitable file formats include XML files such as Microsoft Word XML files, WC3ORG XML files, and Microsoft PowerPoint XML files. Other Microsoft Office XML file formats can also be used in some embodiments. It has been indicated above that in some case segments may represent images, and in such cases image files will typically be used. Of course, such image files can take any suitable form. Thus, while images such as photographs may be represented using JPEG or TIFF files other image files may be represented using other file formats. Such file formats include, for example, Visio files.

It has been indicated above that segments that represent images can be represented using image files. Image files do however have additional applicability in some embodiments of the present invention. Specifically, it has been explained that in some embodiments, when document files are stored as a master object and a plurality of segment objects, the master object and the segment objects being combined to display the document, both the master object and the segment objects can be stored in native file format (e.g. the Microsoft Word format). In order for this to be possible, it is necessary to ensure that the native application (e.g. Microsoft Word) is able to provide suitable locking for segment objects which a user desires to see but which can not be edited given that they are being edited by other users. Thus, as described above when the master object and the segment objects are combined it is necessary to provide some range locking mechanism such that parts of the document relating to particular segments are locked to prevent editing. If such range locking is not available, segments which are provided to a user on a read-only basis can be provided using image files. That is, alongside a native file format version of a particular segment object an image file for that segment object can be stored. In the case where the segment object represents textual information, it will be appreciated that it is not practicable to edit the text by editing the image file. Indeed, such editing will be outside the capabilities of many word processors. However, using the image file in this way does allow read-only segment objects to be provided to a user for read only access.

Additionally, providing textual information in the form of image files may have other benefits. Specifically, meta data associated with particular segments need not be provided to a user, thereby enhancing security. It will be appreciated that when image files are used in this way, versioning of the type described above can still be employed, and it will also be appreciated that such image files can be linked to a master object in a manner similar to that described above.

Various references have been made to referencing segment objects from a master object using pointers. It will be appreciated that these pointers can take any convenient form, such as the use of Word bookmarks in the manner described above.

Various aspects of the invention have been described with reference to methods, systems and computer programs. It will be appreciated that all aspects of the invention are equally applicable to methods, systems, appropriately programmed computers and computer programs. Such computer programs can of course be embodied on suitable carrier media such as both tangible carrier media and communication lines.

The invention claimed is:

1. An editable information management method comprising:

storing editable information as a master file and a plurality of segment files, each segment file being editable independently of other segment files;

combining said master file and said segment files in a manner specified by said master file to create said editable information;

displaying said editable information for editing using an application program, said application program comprising an add in configured to combine said segment objects;

receiving edit instructions to edit part of the displayed editable information corresponding to a predetermined segment file; and updating said predetermined segment file in response to said editing.

2. A method according to claim 1, comprising displaying markers identifying boundaries between segment objects within said displayed editable information.

3. A method according to claim 1, wherein at least one segment object within said displayed editable information is locked to prevent editing.

4. A method according to claim 3, wherein the at least one locked segment is marked in said displayed editable information.

5. A method according to claim 1, wherein the master file comprises editable information.

6. A method according to claim 1, wherein said master file comprises data indicating positional information relating to said plurality of segment objects, and said method parses said master file to insert said segment files into said master file to create said displayed editable information.

7. A method according to claim 6, wherein said master file comprises a plurality of pointers, each pointer indicating a segment file.

8. A method according to claim 7, wherein said segment files are files having a format selected from the group consisting of document files, sub document files, word document files, word sub-document files, XML files, Word XML files, WC3 Org XML files, and image files.

9. A method according to claim 1, wherein said master file is a document file.

10. A method according to claim 1, wherein data relating to said master file and said plurality of segment files is stored in a database.

11. A method according to claim 10, wherein said database comprises a plurality of master files, each relating to respective editable information.

12. A method according to claim 1, comprising storing a plurality of different versions of the master file.

13. A method according to claim 12, wherein the database additionally comprises a database table having a single record for said master file identifying a latest version of said master file.

14. A method according to claim 1, comprising storing data relating to a plurality of different versions of each segment file in a segments database table.

15. A method according to claim 1, wherein a database comprises a links table storing relationships between said master file and said plurality of segment files.

16. A method according to claim 15, wherein said links table comprises a record for each segment file related to said master file.

17. A method according to claim 1, comprising selecting at least one further segment file for inclusion in said displayed editable information, and including said further file in said displayed editable information.

18. A method according to claim 17, wherein a database comprises a links table storing relationships between said master file and said plurality of segment files, and the method further comprises adding a record to said links table representing said further segment file.

19. A method according to claim 1, wherein at least one of said segment files is associated with a plurality of master files.

20. A method according to claim 1, wherein said application program is Microsoft® Word®.

21. A method according to claim 1, wherein said add in communicates with a broker application configured to retrieve editable information data from a database.

22. A method according to claim 21, wherein said application program and said broker application are run on a workstation, said database is run on a server remote from said workstation, and communication between said broker application and said database is carried out over a computer network.

23. A method according to claim 22, wherein the computer network is the Internet.

24. A method according to claim 21, wherein said broker application and said application program are run under an operating system comprising a registry and when data is to be transmitted from the broker application and the application program:
    the broker application places data in the registry; and
    the application program retrieves said data from the registry.

25. A method according to claim 21, wherein said broker application and said application program are run under an operating system comprising a registry and when data is to be transmitted from the application program to the broker application:
    the application program places data in the registry; and
    the broker application retrieves said data from the registry.

26. A method according to claim 21, wherein said broker application communicates with said add in using the Transmission Control Protocol (TCP).

27. A method according to claim 21, wherein the application program is run on a workstation, the broker application and the database are run on a server remote from said workstation, and communication between said add in and said broker application is carried out over a computer network.

28. A method according claim 21, wherein a plurality of workstations are configured to communicate with said database.

29. A method according to claim 1, wherein said application program is a word processor or a spreadsheet.

30. An editable information management system comprising:
    storage means for storing editable information as a master file and a plurality of segment files, each segment file being editable independently of other segment files;
    combining means for combining said master file and said segment files in a manner specified by said master file to create said editable information;
    an application program adapted to display said editable information, said application program comprising an add in configured to combine said segment objects;
    editing means for editing part of the displayed editable information corresponding to a predetermined segment file; and
    updating means for updating said predetermined segment file in response to editing carried out using said editing means.

31. A system according to claim 30, wherein said display means comprises means for displaying markers identifying boundaries between segment objects within said displayed editable information.

32. A system according to claim 30, further comprising means to lock at least one segment object within said displayed editable information to prevent editing by said editing means.

33. A system according to claim 32, wherein said display means comprises means for marking the at least one locked segment in said displayed editable information.

34. A system according to claim 30, wherein said storage means is configured to store said editable information as a master file and a plurality of segment files, and said combining means is configured to combine the master file and the plurality of segment files in a manner specified by said master file to create said displayed editable information.

35. A system according to claim 34, wherein said master file comprises data indicating positional information relating to said plurality of segment files, and said combining means is configured to parse said master file to insert said segment files into said master file to create said displayed editable information.

36. A system according to claim 35, wherein said master file comprises a plurality of pointers, each pointer indicating a sub document file.

37. A system according to claim 34, wherein said storage means stores said data relating to said master file and said plurality of segment files in a database.

38. A system according to claim 37, wherein said storage means is configured to store a plurality of different versions of the master file.

39. A system according to claim 38, wherein said storage means stores data relating to said plurality of different versions in a master file versions database table.

40. A system according to claim 39, wherein the database additionally comprises a database table having a single record for said master file identifying a latest version of said master file.

41. A system according to claim 37, wherein said storage means stores data relating to a plurality of different versions of each segment file in a segments database table.

42. A system according to claim 37, wherein said database comprises a links table storing relationships between said master file and said plurality of segment files.

43. A system according to claim 42, wherein said links table comprises a record for each segment file related to said master file.

44. A system according to claim 37, wherein said database comprises a plurality of master file, each relating to respective editable information.

45. A system according to claim 44, wherein at least one of said segment files is associated with a plurality of master files.

46. A system according to claim 30, further comprising means for selecting at least one further segment file for inclusion in said displayed editable information, and means for including said further segment file in said displayed editable information.

47. A system according to claim 46, wherein a database comprises a links table storing relationships between said master file and said plurality of segment files and he system further comprises means for adding a record to said links table representing said further segment object.

48. A system according to claim 30, wherein said add in is configured to communicate with a broker application configured to retrieve editable information from a database.

49. A system according to claim 48, comprising at least one workstation and a server remote from said workstation connected to said workstation by a computer network, wherein:
said application program and said broker application are run on the workstation;
said database is run on the server; and
communication between said broker application and said database is carried out over said computer network.

50. A system according to claim 49, wherein the computer network is the Internet.

51. A system according to claim 48, wherein said broker application and said application program are run under an operating system comprising a registry and data is transmitted from the broker application to the application program via said registry.

52. A system according to claim 48, wherein said broker application and said application program are run under an operating system comprising a registry and data is transmitted from the application program to the broker application via said registry.

53. A system according to claims 48, wherein said broker application comprises means for communication with said add in using the Transmission Control Protocol (TCP).

54. A system according to claim 48, comprising at least one workstation and a server remote from said workstation connected to said workstation by a computer network, wherein:
said application program is run on the workstation;
said broker application and said database are run on the server; and communication between said broker application and said database is carried out over said computer network.

55. A system according to claim 54, wherein said broker application and said add in comprises means for communication using the TCP protocol.

56. A system according to claim 48, comprising a plurality of workstations configured to communicate with said database.

57. A system according to claim 30, wherein said application program is a word processor or a spreadsheet.

58. A computer program product comprising computer readable instructions for controlling a computer to:
store editable information as a master file and a plurality of segment files, each segment file being editable independently of other segment files;
combine said master file and said segment files in a manner specified by said master files to create said editable information;
display said editable information for editing using an application program, said application program comprising an add in configured to combine said segment objects;
receive edit instructions to edit part of the displayable information corresponding to a predetermined segment file; and
update said predetermined segment file in response to said editing.

59. A computer apparatus comprising:
a program memory containing processor readable instructions; and
a processor for reading and executing the instructions contained in the program memory;
wherein said processor readable instructions comprise instructions controlling the processor to:
store editable information as a master file and a plurality of segment files, each segment file being editable independently of other segment files;
combine said master file and said segment files in a manner specified by said master files to create said editable information;
display said editable information for editing using an application program, said application program comprising an add in configured to combine said segment objects;
receive edit instructions to edit part of the displayable information corresponding to a predetermined segment file; and
update said predetermined segment file in response to said editing.

60. An editable information management method comprising:
storing a editable information as a plurality of segment objects, each segment object being editable independently of other segment objects;
combining said segment objects to create said editable information;

displaying said editable information for editing using an application program;

receiving edit instructions to edit part of the displayed editable information corresponding to a predetermined segment object; and updating said predetermined segment object in response to said editing;

wherein said application program comprises an add-in configured to carry out said combining, a broker application is configured to retrieve segment objects from a data-store, and said broker application and said add-in communicate via an operating system registry.

61. A method according to claim 60, wherein said broker application writes data to said registry and said add in reads data from said registry.

62. An editable information management method comprising:

storing editable information as a plurality of segment objects, each segment object being editable independently of other segment objects;

combining said segment objects to create said editable information;

displaying said editable information for editing using an application program, said application program comprising an add in configured to combine said segment objects;

receiving edit instructions to edit part of the displayed editable information corresponding to a predetermined segment object; and updating said predetermined segment object in response to said editing.

* * * * *